US012504717B2

(12) United States Patent
Christmas

(10) Patent No.: US 12,504,717 B2
(45) Date of Patent: Dec. 23, 2025

(54) OPTICAL SYSTEM

(71) Applicant: Envisics Ltd, Milton Keynes (GB)

(72) Inventor: Jamieson Christmas, Milton Keynes (GB)

(73) Assignee: Envisics Ltd., Milton Keynes (GB)

( * ) Notice: Subject to any disclaimer, the term of this patent is extended or adjusted under 35 U.S.C. 154(b) by 37 days.

(21) Appl. No.: 18/502,256

(22) Filed: Nov. 6, 2023

(65) Prior Publication Data

US 2024/0288826 A1    Aug. 29, 2024

(30) Foreign Application Priority Data

Feb. 28, 2023    (GB) .................................... 2302916

(51) Int. Cl.
*G03H 1/22* (2006.01)
*G03H 1/16* (2006.01)
*G03H 1/00* (2006.01)

(52) U.S. Cl.
CPC ............. *G03H 1/2205* (2013.01); *G03H 1/16* (2013.01); *G03H 2001/0088* (2013.01);
(Continued)

(58) Field of Classification Search
CPC .................. G03H 1/2205; G03H 1/16; G03H 2001/0088; G03H 2001/221;
(Continued)

(56) References Cited

U.S. PATENT DOCUMENTS

| 6,729,541 B1 * | 5/2004 | Kurokawa | G03H 1/0408 |
| | | | 235/462.34 |
| 2002/0122015 A1 * | 9/2002 | Song | G02B 27/0172 |
| | | | 345/8 |

(Continued)

FOREIGN PATENT DOCUMENTS

| EP | 3 754 432 A1 | 12/2020 |
| GB | 2603518 A | 8/2022 |
| GB | 2610203 A | 1/2023 |
| KR | 10-2019-0112147 A | 10/2019 |
| KR | 10-2021-0068983 A | 6/2021 |
| KR | 10-2022-0086456 A | 6/2022 |

OTHER PUBLICATIONS

Extended European Search Report issued May 8, 2023 in EP Application 23210071.9 (9 pages).

(Continued)

*Primary Examiner* — Timothy R Newlin
(74) *Attorney, Agent, or Firm* — Akerman LLP

(57) ABSTRACT

There is provided an optical system having a viewing window. The optical system comprises a display device arranged to spatially modulated light in accordance with a hologram displayed thereon to form a holographic wavefront. The holographic wavefront forms a holographic reconstruction of an image downstream of the display device. The optical system further comprises a waveguide arranged to receive the holographic wavefront and waveguide the holographic wavefront between a pair of reflective surfaces thereof. One surface of the pair of reflective surfaces is partially transmissive such that a plurality of replicas of the holographic wavefront are emitted therefrom. The optical system further comprises an optical component between the holographic reconstruction and the waveguide, wherein the optical component is arranged to (a) form a virtual image of the holographic reconstruction upstream of the display device and (b) form an image of the displayed hologram at infinity or downstream of the waveguide.

12 Claims, 12 Drawing Sheets

(52) U.S. Cl.
CPC ... *G03H 2001/221* (2013.01); *G03H 2222/52* (2013.01); *G03H 2223/16* (2013.01)

(58) Field of Classification Search
CPC .......... G03H 2222/52; G03H 2223/16; G03H 1/0808; G03H 1/2294; G03H 2001/2255; G03H 2001/2242; G03H 2001/226; G03H 1/0443; G03H 1/22; G03H 1/2202; G03H 1/2249; G03H 1/265; G03H 1/26; G03H 1/02; G03H 2223/14; G03H 2223/23; G02B 27/0103; G02B 2027/0174; G02B 27/0172; G02B 27/0081; G02B 2027/0125; G02B 5/32
See application file for complete search history.

(56) References Cited

U.S. PATENT DOCUMENTS

| | | | |
|---|---|---|---|
| 2002/0176173 A1* | 11/2002 | Song | G02B 27/0172 359/630 |
| 2005/0286101 A1* | 12/2005 | Garner | G03H 1/02 359/9 |
| 2009/0207466 A1* | 8/2009 | Bucklay | H04N 5/7441 359/9 |
| 2016/0026253 A1* | 1/2016 | Bradski | H04N 13/128 345/8 |
| 2017/0364028 A1 | 12/2017 | Christmas | |
| 2018/0120563 A1* | 5/2018 | Kollin | G03B 21/005 |
| 2018/0210396 A1* | 7/2018 | Popovich | G03H 1/202 |
| 2019/0339558 A1* | 11/2019 | Waldern | G02F 1/1347 |
| 2020/0174255 A1* | 6/2020 | Hollands | G02B 27/0103 |
| 2020/0183079 A1 | 6/2020 | Leister | |
| 2021/0055549 A1* | 2/2021 | Chang | G02B 27/0081 |
| 2021/0055555 A1* | 2/2021 | Chi | G02B 27/44 |
| 2021/0080698 A1* | 3/2021 | Chen | G02B 13/0045 |
| 2021/0318537 A1* | 10/2021 | Kim | G02B 27/0103 |
| 2022/0011660 A1* | 1/2022 | Ogawa | G02B 27/0172 |
| 2022/0334395 A1* | 10/2022 | Kim | G06T 19/006 |
| 2023/0098034 A1* | 3/2023 | Xu | G02B 27/0101 385/24 |
| 2023/0143728 A1* | 5/2023 | Newman | G03H 1/02 359/11 |
| 2023/0244021 A1* | 8/2023 | Chrysler | G02B 5/003 359/15 |
| 2024/0019625 A1* | 1/2024 | Boardman | G02B 5/32 |
| 2024/0168433 A1* | 5/2024 | Jang | G02F 1/134363 |

OTHER PUBLICATIONS

Combined Search and Examination Report issued on Aug. 24, 2023 in UK Application GB 2302916.8 (5 pages).
Office Action issued Nov. 15, 2025 in Korean App. No. 10-2023-0169873 (5 pages).
English translation of Office Action issued Nov. 15, 2025 in Korean App. No. 10-2023-0169873 (5 pages).

* cited by examiner

OPTICAL SYSTEM

CROSS-REFERENCE TO RELATED APPLICATIONS

This application claims priority under 35 U.S.C. § 119 to UK Patent Application GB 2302916.8 titled "Optical System," filed on Feb. 28, 2023, and currently pending. The entire contents of GB 2302916.8 are incorporated by reference herein for all purposes.

FIELD

The present disclosure relates to an optical system and methods of image formation using an optical system. More specifically, the present disclosure relates to an optical system arranged to form a virtual image of a holographic reconstruction that is far removed from an image of a hologram. The present disclosure also relates to a method of displacing the image plane of a hologram and a method of increasing the distance between an image of a holographic reconstruction and the image of the corresponding hologram. Some embodiments relate to a holographic projector, picture generating unit or head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

There is disclosed herein a holographic projector comprising an optical system comprising a display device. The holographic projector may comprise an optical relay. The optical relay may comprise a first lens and a second lens. The first and second lens may be arranged in a so-called $4f$ configuration. The holographic projection may further comprise one or more waveguide pupil expanders. The display device is arranged to spatially modulate light in accordance with a hologram of a picture displayed thereon. The display device may be positioned at a front focal plane of the first lens. The optical system may be arranged such that the display device is illuminated with coherent light which is spatially modulated in accordance with the hologram and then received by the first lens of the optical relay such that a holographic reconstruction of the picture is formed at the back focal plane of the first lens. The light may then continue to propagate and be received by the second lens of the optical relay such that a relayed image of the display device (i.e. a relayed image of the hologram) may be formed at the back focal plane of the second lens. A first waveguide is positioned near the back focal plane of the second lens and may be arranged to receive the spatially modulated light and replicate that light to expand an exit pupil of the optical system in a first direction. A second waveguide may also be provided arranged to receive the light output from the first waveguide to expand the exit pupil of the optical system in a second direction. Conceptually, the result of this may be considered the creation of an array of replicas of the display device. The array of replicas may be said to exist on a "virtual surface" which may be staggered as explained in British patent application, GB2118911.3 filed on 23 Dec. 2021. In particular, each replica may be a different perpendicular distance from the display device owing to different path lengths in the waveguide associated with each replica. Thus, the part of the virtual surface (e.g. in the x, y dimensions) associated with each replica is offset from the display device in the perpendicular direction (e.g. in the z dimension). A virtual image of the holographic reconstruction is visible when a viewing system (such as the eye of a user) is positioned at a viewing window downstream of the waveguide/s. The virtual image may be formed at a virtual image distance upstream of the display device. Typically, the virtual image distance may be between about 1 metre and about 10 or 20 metres.

As used herein, the terms "upstream" and "downstream" may be used to describe the relative positions of features, elements or components of an optical system, or (real or virtual) images or holographic reconstructions formed by the optical system, with reference to the direction of propagation of light through the optical system. For example, in an optical system in which light propagates to a first component and then a second component, the first component may be described as being upstream of the second component and the second component may be described as being downstream of the first component. A virtual image formed by an optical component may be described as being formed upstream of the respective optical component. A real image formed by an optical component may be described as being formed downstream of the respective optical component.

One of the advantages of the above optical system is that it increases the viewing window (i.e., a user's eye-box) in one or two dimensions, thus enabling some movement of the eye/s (or other viewing system) to occur, whilst still enabling the viewing system to see the holographic reconstruction even with a very small display device/hologram. However, the inventors have found that, while the virtual image of the holographic reconstruction per se (when focusing at the virtual image distance) may be of good quality, artefacts may be formed/visible. These artefacts may appear to be in front (i.e. downstream) of the virtual image of the holographic reconstruction. These artefacts may be formed at or visible on the virtual surface—that is, an area corresponding to the array of the replicas of the display device. As waveguide/s form an array of replicas, each artefact formed in a single replica will be repeated a quality of times forming a repeating pattern of the artefact(s) at the array of the replicas of the display device. The viewing system/user at the viewing window may effectively have to look through or look past the pattern of artefacts to view the virtual image of the holographic reconstruction.

The inventors have found that eyes are typically very capable at viewing image content at different depths—or at least being conscious of the presence of features at different depths. Thus, both the virtual image of the holographic reconstruction and the non-uniform intensity array at the plane of the replicas may be at least semi-perceived simultaneously by a human viewer. The inventors have found that the eyes of a user are drawn to the (repeating pattern) of artefacts which can be a distraction from the virtual image of the holographic reconstruction which the user is intended to view-even when the viewer is focused on the image (i.e. holographic reconstruction) not the corresponding hologram (or image thereof) which is a different distance to the viewer. The inventors have identified through their studies that (even though some viewers do not initially notice) once a viewer has become aware of the (repeating pattern) of artefacts, it is (or can become) a significant distraction. The inventors have suggested that an analogy to this could be looking at a distant scene through a transparent, glass window. In this case, a mark or feature (e.g. dirt or smear) on the glass may constitute an artefact that the viewer has to look through or past to see the scene behind. If a viewer becomes conscious of the mark on the glass (and, again, they may not), the presence of the mark may at least partially spoil the view of the scene even when the viewer is focused on the scene rather than the glass. In summary, the inventors have found that the virtual surface formed by the waveguide replicator/s of the present disclosure can affect the quality of the viewing experience.

There are a number of different artefacts that may be formed at the virtual surface—i.e. the area of the replicas of the display device. Such artefacts may result from scattering of light by the optical system, for example scattering of the holographic wavefront formed by the display device. Artefacts may also be formed as a result of physical features of the display device (such as the border of the display device). Again, these artefacts may appear at the location of the array of replicas rather than at the location of the virtual image and so may draw the attention of the eye of the user and act as a distraction from the virtual image.

There are several reasons why the virtual surface may be distracting. By way of example only, the inventors have identified that one source of distraction on the virtual surface may be a result of non-uniform illumination of the display device. This non-uniform illumination may arise if the profile of the source light is non-uniform—for example, has a Gaussian intensity profile. The inventors found that small decreases in intensity at the edges of the light spot that illuminates the hologram resulted in the formation of extended bands or contours of contrast (where the replicas adjoin) which are visible from the eye-box. Significantly, these bands or contours are substantially straight (and substantially aligned/parallel with the two orthogonal directions of hologram replication). Whilst this banding was extremely subtle (in terms of intensity), the human eye is very sensitive to edge and line features (i.e. straight-line contrast) and the negative impact on the quality of the viewing experience was therefore surprisingly high. That is, the extended straight-line bands or contours-resulting from the regular pattern of hologram replication and "normal" non-uniformities of the source light which are completely acceptable for other types of holographic display-were surprisingly prominent to some human viewers. The dark bands may be formed at the plane of the replicas so a viewing system may have to effectively look through or past the dark bands to view the virtual image of the holographic reconstruction.

The optical system according to the present disclosure provides a means for substantially reducing or minimizing the visual impact of the virtual surface of replicas.

In general terms, there is provided an optical system having a viewing window. The optical system comprises a display device arranged to spatially modulate light in accordance with a hologram displayed thereon. The spatially modulated light forms a holographic wavefront which forms a holographic reconstruction of an image downstream of the display device. The optical system further comprises an optical component (for example, a lens). The optical component is arranged downstream of the holographic reconstruction (such that the spatially modulated light forms the holographic reconstruction, for example at a replay plane, and is then received at the optical component). The optical component is arranged to form: a) a virtual image of the holographic reconstruction; and b) an image of the displayed hologram/display device. The optical component is arranged such that a magnitude of the separation of the virtual image of the holographic reconstruction and the image of the displayed hologram/display device is greater than a virtual image distance of the virtual image of the holographic reconstruction. As such the image of the displayed hologram/display device is far removed from the virtual image of the holographic reconstruction. In some embodiments, a magnitude of the separation of the virtual image of the holographic reconstruction and the image of the displayed hologram/display device may be at least double the magnitude of the virtual image distance of the virtual image of the holographic reconstruction, such as at least triple or at least five times the virtual image distance. In some embodiments, a magnitude of the separation of the virtual image of the holographic reconstruction and the image of the displayed hologram/display device may be at least an order of magnitude greater than the magnitude of the virtual image distance of the virtual image of the holographic reconstruction. For example, in some embodiments, a virtual image of the display device is formed at infinity such that the effective distance between the virtual image of the display device and the virtual image of the holographic reconstruction is infinite. In other embodiments, a real image of the display device is formed downstream of the optical component, again far removed from the virtual image of the holographic reconstruction (which will be upstream of the optical component). For example, the real image of the display device may be formed downstream of a waveguide of the optical system, optionally downstream of the viewing window/an eye-box of the optical system. In either case, the optical component is arranged such that the virtual image of the holographic reconstruction is far removed from the image of the displayed hologram/display device. The inventors have found that arranging the optical component in this way advantageously significantly reduces the impact of artefacts of the virtual surface from obstructing/distracting a viewer at the viewing window. In particular, the inventors have recognised that the optical component can be arranged to either form the image of the hologram/display device at infinity (far beyond the virtual image of the holographic reconstruction) or at a position downstream of the optical component (typically behind the viewing system). In either embodiment, the viewer is not be required to look through or past the image of the hologram/display device to view the virtual image of the holographic reconstruction when the optical component is arranged in this way. The inventors have found that this significantly improves the viewing experience. Specifically, artefacts (such as a non-uniform intensity pattern of dark bands) in the image of the of the hologram/display device, are much less of a distraction. The viewing system/eye/brain may be able to more effectively ignore the artefacts when at said image distances.

In some embodiments, the optical component is arranged to perform a Fourier transform. For example, in these embodiments, it may be said that the optical component is a Fourier transform component such as a Fourier transform lens or, simply, a Fourier lens. The optical component (particularly when functioning as a Fourier lens) may comprise a front focal plane and a back focal plane. The front focal plane may be referred to as an object plane and the back focal plane may be referred to as a Fourier Transform plane. The optical component may be arranged to form, at the back (Fourier) plane, a Fourier transform of the object at the front (object) plane. In accordance with the present disclosure, there is provided an optical component that performs a Fourier transform of the holographic wavefront before replication by the waveguide/s. In some embodiments, it may be said that a transform of the holographic wavefront is input to the waveguide/s and/or the waveguide/s are arranged to replicate a transform of the relayed hologram/holographic wavefront.

In a first aspect there is provided an optical system having a viewing window. The optical system comprises a display device. The display device is arranged to spatially modulated light in accordance with a hologram or diffractive structure displayed thereon to form a holographic wavefront which forms a holographic reconstruction of a picture downstream of the display device. The optical system further comprises an optical component. The optical component may be referred to as an imaging component. An example of an optical component includes a lens, such as a converging lens. The optical component is arranged to:

(a) form a virtual image of the holographic reconstruction upstream of the display device and (b) form an image of the displayed hologram at infinity or downstream of the optical component. The image of the displayed hologram at infinity may be at infinity upstream of the display device (i.e. for behind the display device).

In embodiments the optical system further comprises a waveguide. The waveguide is arranged to receive the holographic wavefront. The waveguide may receive the holographic wavefront from the optical component. The waveguide may be arranged to receive the holographic wavefront directly or indirectly. The waveguide may be arranged to waveguide the holographic wavefront between a pair of reflective surfaces thereof. One surface of the pair of reflective surfaces may be partially transmissive such that a plurality of replicas of the holographic wavefront are emitted therefrom. In embodiments, the optical component may be arranged to form an image of the display hologram at infinity or at or downstream of the waveguide.

In embodiments, the image of the holographic reconstruction is formed by the optical element or component at a different location to the image of the displayed hologram. As used herein, the optical element could be referred to as the optical component. In embodiments, an image distance of the image of the holographic reconstruction is different to an image distance of the image of the displayed hologram. In embodiments, the image distance of the image of the holographic reconstruction is less than infinite, for example less than 30 meters.

In some embodiments, the hologram on the display device is arranged such that spatially modulated light forms a holographic reconstruction of the picture of the hologram downstream of the display device without passing through an optical element or component such as a (physical) (imaging) lens. In embodiments, the optical component may be arranged to form a virtual image of the holographic reconstruction (formed directly by the hologram on the display device). In other embodiments, the holographic reconstruction may be relayed to a position downstream of the holographic reconstruction formed directly by the hologram on the display device. In such embodiments, the optical component may be arranged to form a virtual image of a relayed holographic reconstruction. In other words, rather than directly forming a virtual image of the holographic reconstruction formed by the hologram on the display device, the optical element may be arranged to (directly) form a virtual image of the relayed holographic reconstruction.

In some embodiments, the optical component is arranged to perform a Fourier transform. For example, example, the optical component may be a Fourier lens. The optical component (Fourier lens) may comprise a front focal plane and a back focal plane. The front focal plane may be referred to as an object plane and the back focal plane may be referred to as a Fourier transform plane. The optical component may be arranged to form, at the back (Fourier) plane, a Fourier transform of the light/object/image at the front (object) plane.

The back (Fourier) plane of the optical component may be coupled to the waveguide (when present in the optical system). As used herein, the back (Fourier) plane being coupled to the waveguide may mean that the back focal plane of the optical component coincides (i.e. is substantially coincident with) with the input of the waveguide. In some embodiments, the back (Fourier) plane is adjacent to/overlaps with an incoupling port of the waveguide. In some embodiments, the back (Fourier) plane is within the waveguide. For example, the back (Fourier) plane may be between the pair of reflective surfaces of the waveguide. In this way, the optical component may be arranged such that a Fourier transform of the light/object/image at the front (object) plane of the optical component is coupled into the waveguide.

In some embodiments, the optical component may be arranged to perform a space-frequency transform such that a transformed displayed hologram is coupled into the waveguide. As used herein, a transformed displayed hologram means a hologram predominantly or entirely in the frequency domain. The space-frequency transform may be a Fourier transform. In other words, the optical component may be arranged such that a Fourier transform of a hologram is coupled into the waveguide. In some embodiments, the optical component may be arranged such that a Fourier transform of the hologram displayed on the display device is coupled into the waveguide. This may be the case, for example, when the optical component is arranged to form an image of the displayed hologram at infinity.

The optical component may be arranged such that the wavefront coupled into the waveguide is a (Fourier) transform of a holographic wavefront encoding the picture.

In some embodiments, the object (e.g. the display device/displayed hologram or relayed display device/relayed displayed hologram) may be positioned substantially/exactly at the front focal plane of the optical component. The waveguide (e.g. incoupling port) may be coupled to the back focal plane of the optical component. For example, the back focal plane of the optical component may be positioned at an input port of the waveguide or within the waveguide. The optical component may be arranged such that a Fourier transform of the displayed hologram is coupled into the waveguide.

In some embodiments, the optical system is arranged to perform an odd number of (frequency-time) transforms/Fourier transforms to light propagating between the display device and the waveguide (e.g. one or three transforms between the frequency domain and the time domain/one or threes Fourier transforms). In this way, the wavefront may be said to be in the frequency domain when it is coupled into the waveguide (even if it has undergone multiple—an odd number—of transforms between the space domain and the frequency domain when propagating from the display device to the waveguide). For example, the optical system may comprise a plurality of components arranged to perform a Fourier transform (e.g. a plurality of Fourier transform lenses). The optical component described above may be a first Fourier transform lens. As described below, the optical system may further comprise an optical relay comprising a pair of Fourier lenses. The optical system may be arranged such that each of the pair of Fourier lenses of the optical relay and the optical component perform a frequency-time transform/Fourier transform in turn.

In some embodiments, the optical system further comprises an optical relay. The optical relay may be positioned downstream of the display device. The optical relay may be positioned between the display device and the waveguide (if present). The optical relay may comprise two lenses. The two lenses may be arranged in cooperation to form a relayed hologram and a relayed holographic reconstruction. The relayed hologram may be an image of the hologram displayed on the display device. The relayed holographic reconstruction may be an image of the holographic reconstruction formed by the hologram displayed on the display device. So, in embodiments comprising the optical relay, the (virtual) image of the hologram reconstruction formed by the optical component (e.g. lens) is a (virtual) image of the relayed holographic reconstruction. The (real) image of the displayed hologram formed by the optical component (e.g. lens) is a (real) image of the relayed hologram.

The two lenses of the optical relay may comprise a first lens and a second lens. The first lens of the optical relay may be closer to the display device than the second lens of the optical relay. A distance between the first lens of the optical relay and the second lens of the optical relay may be substantially equal to the sum of the focal length of the first lens and the focal length of the second lens. In some embodiments, the focal length of the first lens of the optical relay is equal to the focal length of the second lens of the optical relay. In other embodiments, the focal length of the first lens of the optical relay is different to the focal length of the second lens of the optical relay. In such embodiments, the optical relay may have a magnifying (or demagnifying) effect on the relayed holographic reconstruction and/or the relayed hologram. The optical relay may be referred to as telescope (e.g. a magnifying or demagnifying telescope). When a distance between the first lens of the optical relay and the second lens of the optical relay is substantially equal to the sum of the focal length of the first lens and the focal length of the second lens, the optical relay may be referred to as "4f" system. This may be because a distance between a front focal plane of the first lens and a back focal plane of the second lens is equal to four focal lengths. When the focal length of the first and second lenses is the same, the distance between a front focal plane of the first lens and a back focal plane of the second lens may be equal to four times the focal length of either of the first and second lens. In some embodiments, the first lens comprises a front focal plane and a back focal plane and the second lens comprises a front focal plane and a back focal plane. In some embodiments, the display device may be positioned substantially at the front focal plane of the first lens of the optical relay. In some embodiments, back focal plane of the first lens of the optical relay may be substantially coincident with the front focal plane of the second lens of the optical relay. The back focal plane of the first lens of the optical relay may be substantially parallel to the front focal plane of the second lens of the optical relay. The back focal plane of the first lens of the optical relay may be substantially co-planar to the front focal plane of the second lens of the optical relay.

The relayed hologram and relayed holographic reconstruction (that are relayed by the optical relay) may be relayed to respective positions downstream of the optical relay, for example downstream of the second lens of the optical relay. In some embodiments, the relayed holographic reconstruction is downstream of the relayed hologram. In other words, a distance between (the second lens of) the optical relay and the relayed holographic reconstruction may be greater than a distance between (the second lens of) the optical relay and the relayed hologram.

In some embodiments, the relayed hologram may be formed/relayed to the back focal plane of the second lens of optical relay. This may mean that an image of the hologram displayed on the display device is substantially in focus at the back focal plane of the second lens of the optical relay. In some embodiments, the relayed holographic reconstruction may be formed/relayed to a focal plane of the relayed holographic reconstruction. This may mean that an image of the holographic reconstruction is substantially in focus at the focal plane of the relayed holographic reconstruction. The focal plane of the relayed holographic reconstruction may be substantially parallel to the back focal plane of the second lens of the optical relay. The focal plane of the relayed holographic reconstruction may be downstream of the back focal plane of the second lens of the optical relay.

In some embodiments, the optical component (e.g. lens) is downstream of the relayed holographic reconstruction. The optical component may also be downstream of the relayed hologram. The optical component may be closer to the relayed holographic reconstruction than the relayed hologram.

In embodiments comprising the waveguide, the optical component may be between the relayed holographic reconstruction and the waveguide.

In some embodiments, the optical component may be (arranged) between the relayed holographic reconstruction and the waveguide such that (a) a distance between the relayed holographic reconstruction and the optical component is less than a focal length of the optical component. Thus, the virtual image of the holographic reconstruction formed by the optical component may be a virtual image of the relayed holographic reconstruction. The optical component may also be (arranged) between the relayed holographic reconstruction and the waveguide such that (b) a distance between the relayed hologram and the optical component is (substantially) equal to a focal length of the optical component. Thus, the image of the hologram formed by the optical component may be a virtual image formed (substantially) at infinity. The virtual image of the hologram may be formed upstream of the relayed hologram/upstream of the optical component/upstream of the display device. The virtual image of the holographic reconstruction formed by the optical component may also be upstream of the optical component but at a finite image distance. As such, an effective distance or separation between the virtual image of the hologram (at infinity) and the virtual image of the hologram (not at infinity) is effectively infinite.

In other embodiments (comprising the optical relay as defined above), the optical component may be (arranged) between the relayed holographic reconstruction and the waveguide such that (a) a distance between the relayed holographic reconstruction and the optical component is less than a focal length of the optical component. Thus, the virtual image of the holographic reconstruction formed by the optical component may be a virtual image of the relayed holographic reconstruction. The optical component may also be (arranged) between the relayed hologram and the optical component such that (b) a distance between the relayed hologram and the optical component is greater than a focal length of the optical component. Thus, the image of the hologram formed by the optical component may be a real image. The real image of the hologram may be formed downstream of the optical component. The real image of the hologram may be formed substantially at or downstream of the waveguide. The virtual image of the holographic reconstruction formed by the optical component may be upstream of the optical component (at a finite image distance). Thus, there may be a relatively large distance or separation between the virtual image of the holographic reconstruction (upstream of the optical component) and the real image of the hologram (downstream of the optical component).

In some embodiments, the optical system does not comprise a/the optical relay. In such embodiments, the optical component (e.g. lens) of the optical system may be arranged to form the (virtual) image of the virtual hologram reconstruction and the (real) image of the displayed hologram based on the holographic reconstruction formed downstream of the display device and hologram displayed on the display device respectively.

In some embodiments, a distance between the holographic reconstruction (rather than a relayed holographic reconstruction, as in the above embodiments) and the optical component is less than a focal length of the optical component. Thus, the image of the holographic reconstruction may be a virtual image. The virtual image of the holographic reconstruction may be formed upstream of the display device. A distance between the display device or hologram (rather than a relayed hologram, as in the above embodiments) and the optical component may substantially equal to a focal length of the optical component. Thus, a virtual image of the hologram may be formed at infinity. The virtual image of the hologram may be formed upstream of the hologram displayed on the display device/upstream of the optical component. The virtual image of the holographic reconstruction formed by the optical component may also be upstream of the optical component but at a finite image distance. As such, an effective distance or separation between the virtual image of the hologram (at infinity) and the virtual image of the hologram (not at infinity) may be effectively infinite.

In some embodiments, a distance between the holographic reconstruction (not a relayed holographic reconstruction) and the optical component is less than a focal length of the optical component. Thus, the image of the holographic reconstruction may be a virtual image. The virtual image of the holographic reconstruction may be formed upstream of the optical component and/or display device. A distance between the display device/hologram displayed on the display device (not a relayed hologram) and the waveguide may be greater than a focal length of the optical component. Thus, an image of the hologram (displayed on the display device) may be formed downstream of the optical component. The real image of the hologram may be formed substantially at or downstream of the waveguide. Thus, there may be a relatively large distance or separation between the virtual image of the holographic reconstruction (upstream of the optical component and/or display device) and the real image of the hologram (downstream of the optical component and/or at or downstream of the waveguide). The image of the hologram may be a real image.

In some embodiments, the image of the hologram formed by the optical component is a real image of the hologram formed downstream of a viewing window (e.g. eye-box) of the optical system.

In some embodiments, a distance between the virtual image of the holographic reconstruction and the (real or virtual) image of the displayed hologram formed by the optical component is greater than 1 metre such as greater than 2 metres or greater than 5 metres. In some embodiments, a separation between the (virtual) image of the holographic reconstruction and a virtual image of the display device may be effectively infinite. More generally, a separation between the (virtual) image of the holographic reconstruction and the (virtual or real) image of the display device may be greater than the virtual image distance of the virtual image of the holographic reconstruction.

In some embodiments, the optical component is arranged such that a distance from the optical component to the virtual image of the holographic reconstruction is in the range 0.5 to 10 metres. For example, the optical component may be positioned (with respect to the holographic reconstruction or relayed holographic reconstruction) and/or have an appropriate optical power to form the virtual image of the holographic reconstruction in said range of distances.

In some embodiments, a focal length of the optical component may be 150 mm or less, such as 120 mm or less, or 100 mm or less. The optical component may be a lens. The optical component may be a converging lens. The optical component may comprise front focal plane at the focal length of the optical component. The optical component may comprise a back focal plane at the focal length of the optical component.

A distance from the holographic reconstruction or relayed holographic reconstruction (if the optical relay is present) to optical component may be less than a distance from the front focal plane to the optical component. In other words, the holographic reconstruction or relayed holographic reconstruction may be closer to the optical component than the front focal plane of the optical component.

In embodiments in which the optical component is arranged such that the image of the hologram formed by the optical component is a virtual image formed at infinity, the front focal plane of the optical component may be substantially coincident with a) the display device or b) a back focal plane of the second lens of the optical relay (if the optical relay is present). The front focal plane of the optical component may be substantially parallel to a plane of the display device or the back focal plane of the second lens of the optical relay. The front focal plane of the optical component may be substantially co-planar to the plane of the display device or the back focal plane of the second lens of the optical relay.

In some embodiments, the holographic wavefront received by the waveguide comprises non-collimated light such as diverging light.

In some embodiments, the display device is a pixelated display device. For example, the spatial light modulator may comprise a regular array of pixels. The array of pixels may cover a substantially quadrilateral display area of the display device. In some embodiments, the display device is a spatial light modulator. In some embodiments, the display device is a liquid crystal on silicon spatial light modulator.

In some embodiments, the hologram comprises a plurality of superimposed diffractive patterns each representative of a lens (e.g. Fresnel lens) that forms am image point of the image.

In some embodiments, each diffractive pattern is representative of a lens/brings light to a focal point.

In a second aspect, there is provided a picture generating unit. The picture generating unit may comprise the optical system of the first aspect. The picture generating unit may further comprise a light source arranged to illuminate the display device of the optical system. The light source may be a coherent light source such as a laser.

In a third aspect, there is provided a head-up display for a vehicle comprising the optical system and/or the picture generating unit of the previous aspect(s).

In a fourth aspect there is provided an optical system having a viewing window. The optical system comprises a display device arranged to spatially modulated light in accordance with a hologram or diffractive structure displayed thereon to form a holographic wavefront. The holographic wavefront forms a holographic reconstruction of an image downstream of the display device. The optical system further comprises a waveguide arranged to receive the holographic wavefront. The waveguide may receive the holographic wavefront directly or indirectly. The waveguide may be arranged to waveguide the holographic wavefront between a pair of reflective surfaces thereof. One surface of the pair of reflective surfaces is partially transmissive such that a plurality of replicas of the holographic wavefront are emitted therefrom. The optical system further comprises an optical component such as an imaging component such as a lens (e.g. a converging lens) between the holographic reconstruction and the waveguide. The optical component is arranged to (a) form a virtual image of the holographic reconstruction upstream of the display device and (b) form an image of the displayed hologram at infinity or downstream of the optical component such as at or downstream of the waveguide. The optical component may be arranged such that the wavefront coupled into the waveguide is a (Fourier) transform of a holographic wavefront encoding the picture.

In a fifth aspect there is provided a method of holographic image formation. The method comprises the step of spatially modulating light in accordance with a hologram. The hologram may be a hologram of an image and is displayed on a display device to form a holographic wavefront. The method further comprises the step of forming a holographic reconstruction of an image downstream of the display device. The method further comprises the step of forming a virtual image of the holographic reconstruction upstream of the display device using an optical component. The optical component may be a lens such as a converging lens and/or Fourier lens (as in the previous aspects). The method may further comprise the step of forming an image of the displayed hologram at infinity or downstream of the waveguide using the optical component. In embodiments, the method further comprises receiving the holographic wavefront at a waveguide. The method may further comprise waveguiding the holographic wavefront between a pair of reflective surfaces thereof, wherein one surface of the pair of reflective surfaces is partially transmissive such that a plurality of replicas of the holographic wavefront are emitted therefrom. The optical component may be downstream of the holographic reconstruction. In embodiments, the optical component may be between the holographic reconstruction and the waveguide.

In some embodiments, the method comprises forming a relayed hologram as an image of the hologram displayed on the display device. The step of forming a relayed hologram may comprise using an optical relay between the display device and the waveguide. The optical relay comprise two lenses arranged in cooperation.

In some embodiments, the method comprises forming a relayed holographic reconstruction as an image of the holographic reconstruction formed by the hologram displayed on the display device. The step of a relayed holographic reconstruction may comprise using the optical relay.

In some embodiments, the step of forming the virtual image of the holographic reconstruction comprises forming a virtual image of the relayed holographic reconstruction. A distance between the relayed holographic reconstruction and the optical component may be less than a focal length of the optical component.

In some embodiments, the step of forming the image of the displayed hologram comprises forming a virtual image of the (relayed) hologram at infinity, and wherein a distance between the between the relayed hologram and the optical component is (substantially) equal to a focal length of the optical component.

In some embodiments, the step of forming the image of the displayed hologram comprises forming a real image of the (relayed) hologram downstream of the optical component/waveguide, and wherein a distance between the relayed hologram and the optical component is greater than a focal length of the optical component.

In some embodiments, the step of forming the virtual image of the holographic reconstruction comprises forming a virtual image of the holographic reconstruction upstream of the display device, and wherein a distance between the holographic reconstruction and the optical component is less than a focal length of the optical component.

In some embodiments, the step of forming an image of the hologram comprises forming a (virtual) image of the hologram at infinity (upstream of the hologram), and wherein a distance between the display device and the waveguide is equal to a focal length of the optical component.

In some embodiments, the step of forming an image of the hologram comprises forming a (real) image of the hologram downstream of the optical component (waveguide), and wherein a distance between the display device and the waveguide is equal to a focal length of the optical component.

In some embodiments, the step of forming the image of the comprises forming a real image of the hologram formed downstream of a viewing window (e.g. eye-box) of the optical system.

Features and advantages disclosed in relation to one aspect may apply to other aspects. In particular, features and advantages described in relation to the optical system may be applicable to the method of holographic image formation, and vice versa.

In the present disclosure, the term "replica" is merely used to reflect that spatially modulated light is divided such that a complex light field is directed along a plurality of different optical paths. The word "replica" is used to refer to each occurrence or instance of the complex light field after a replication event-such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances-providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values.

The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Conventional Optical Configuration for Holographic Projection

Figure 1:
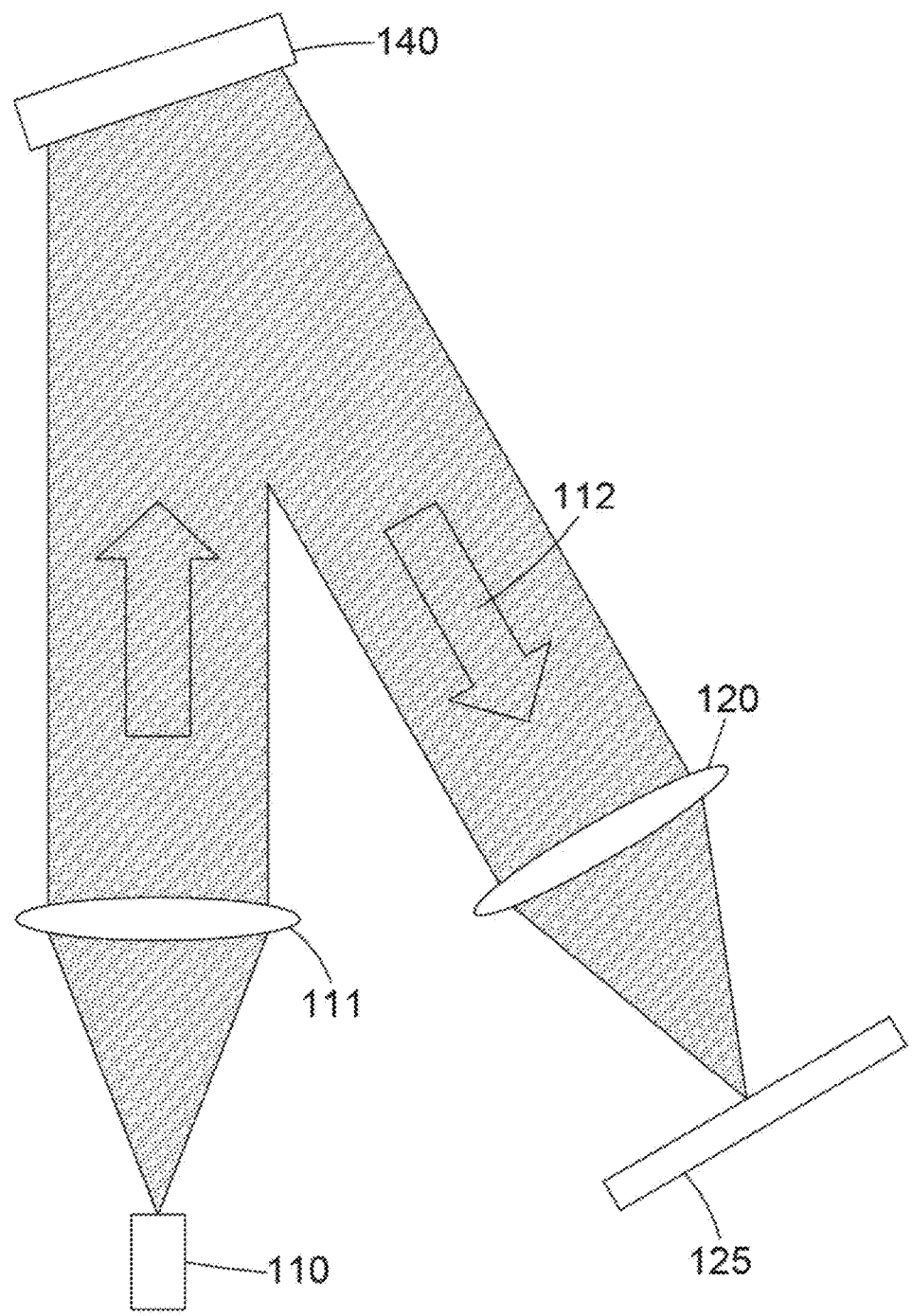
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform In some embodiments of the present disclosure, the lens of the viewer's eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system. British patent application 2101666.2, filed 5 Feb. 2021 and incorporated herein by reference, discloses a first hologram calculation method in which eye-tracking and ray tracing are used to identify a sub-area of the display device for calculation of a point cloud hologram which eliminates ghost images. The sub-area of the display device corresponds with the aperture, of the present disclosure, and is used exclude light paths from the hologram calculation. British patent application 2112213.0, filed 26 Aug. 2021 and incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. British patent application 2118911.3, filed 23 Dec. 2021 and also incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Field of View Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform.

The projection system, or optical system, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one-such as, at least two-orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channelling

The hologram formed in accordance with some embodiments, angularly-divides the image content to provide a plurality of hologram channels which may have a cross-sectional shape defined by an aperture of the optical system. The hologram is calculated to provide this channelling of the diffracted light field. In some embodiments, this is achieved during hologram calculation by considering an aperture (virtual or real) of the optical system, as described above.

Figure 2:
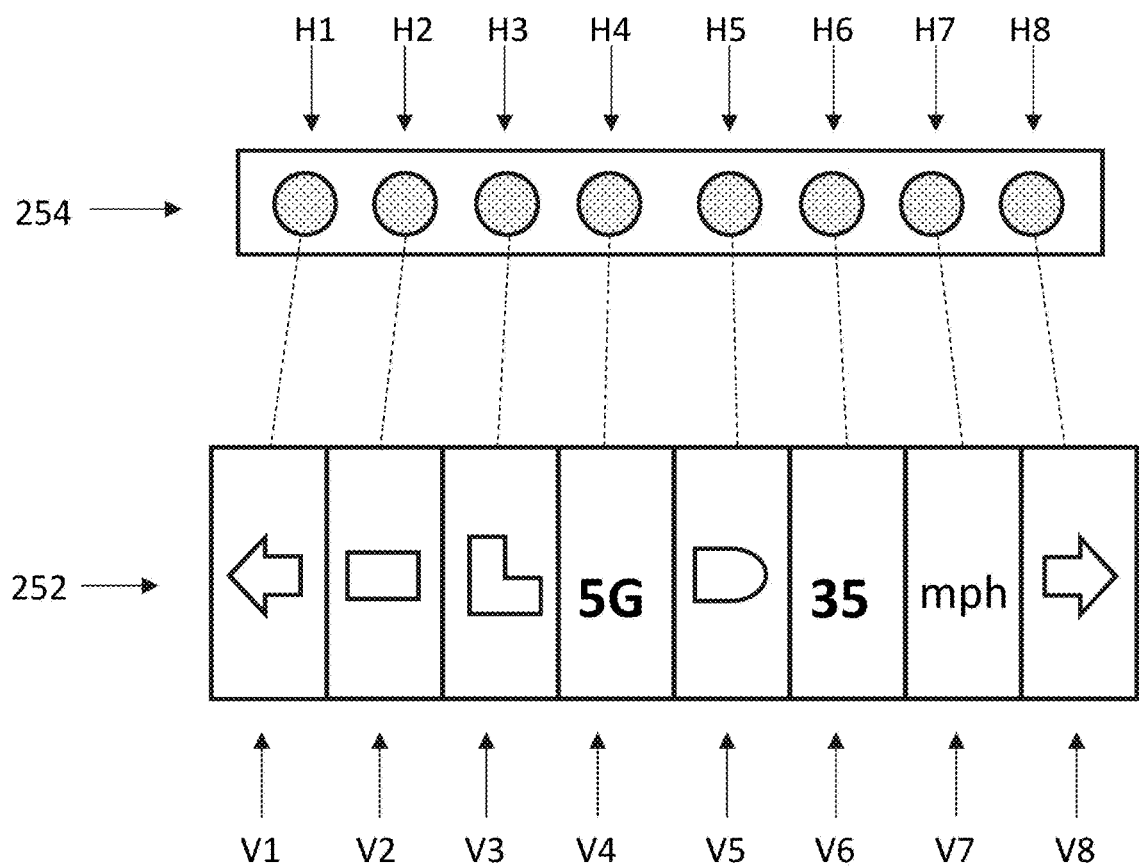
FIG. 2 shows an image for projection comprising eight image areas/components, V1 to V8, and cross-sections of the corresponding hologram channels, H1-H8.
Figure 3:
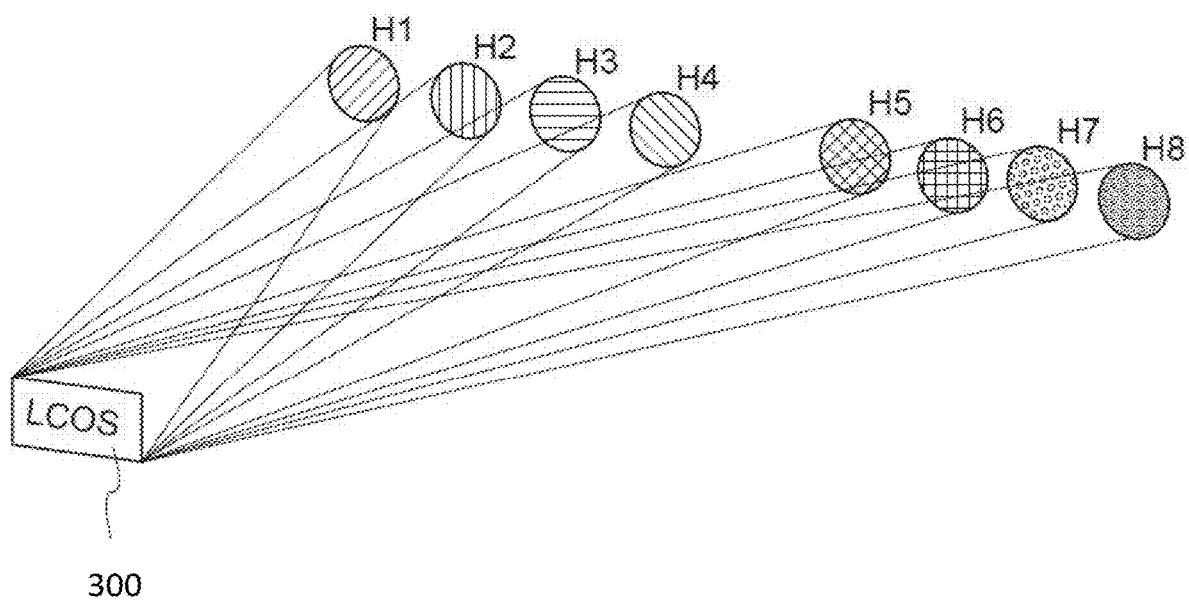
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channelling of light that it performs. This is illustrated in FIG. 3. Specifically, the hologram in this example directs light into a plurality of discrete areas. The discrete areas are discs in the example shown but other shapes are envisaged. The size and shape of the optimum disc may, after propagation through the waveguide, be related to the size and shape of an aperture of the optical system such as the entrance pupil of the viewing system.

Figure 4:
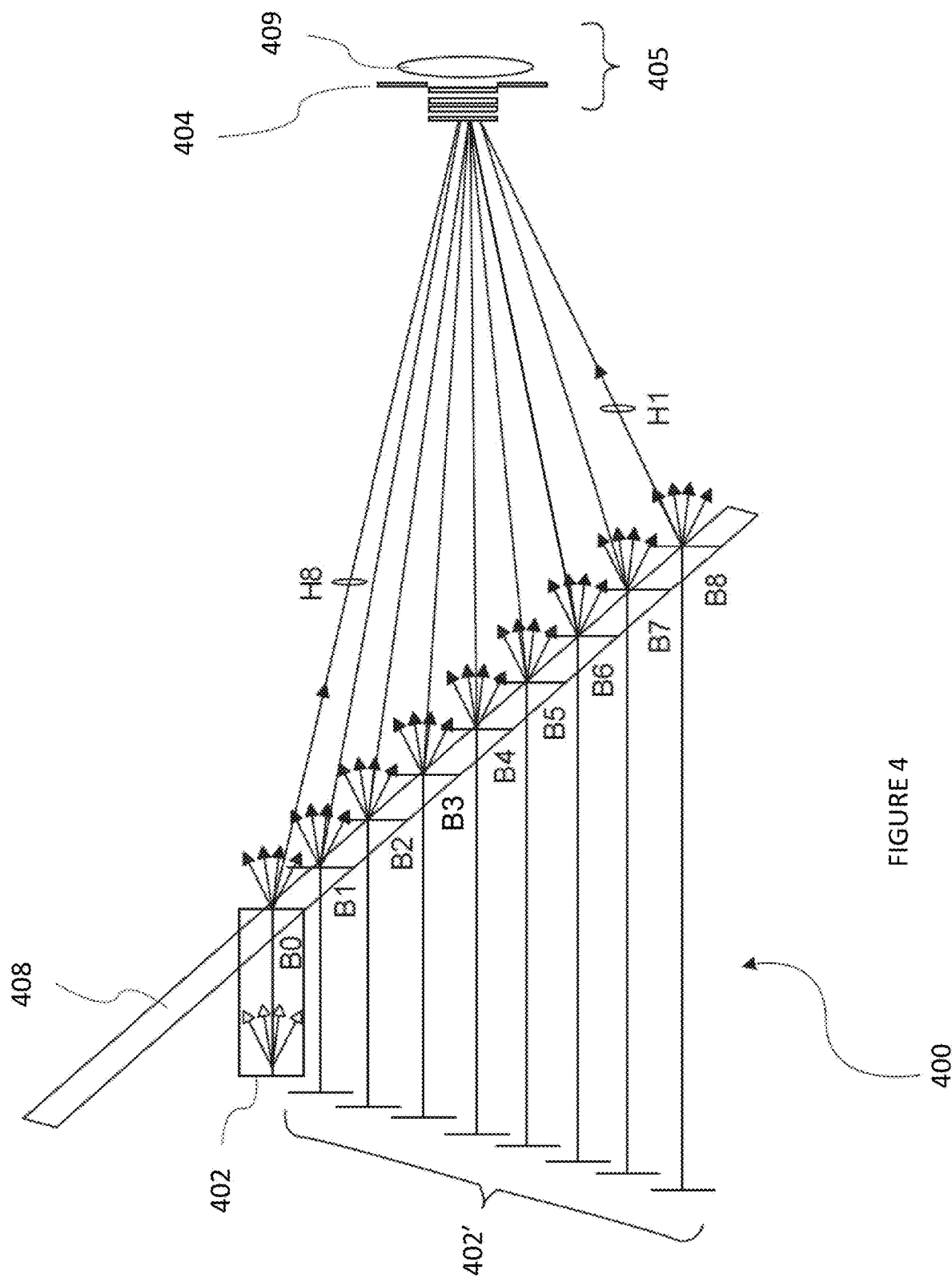
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG.

2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

The waveguide 408 forms a plurality of replicas of the hologram, at the respective "bounce" points B1 to B8 along its length, corresponding to the direction of pupil expansion. As shown in FIG. 5, the plurality of replicas may be extrapolated back, in a straight line, to a corresponding plurality of replica or virtual display devices 402'. This process corresponds to the step of "unfolding" an optical path within the waveguide, so that a light ray of a replica is extrapolated back to a "virtual surface" without internal reflection within the waveguide. Thus, the light of the expanded exit pupil may be considered to originate from a virtual surface (also called an "extended modulator" herein) comprising the display device 402 and the replica display devices 402'.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5A:
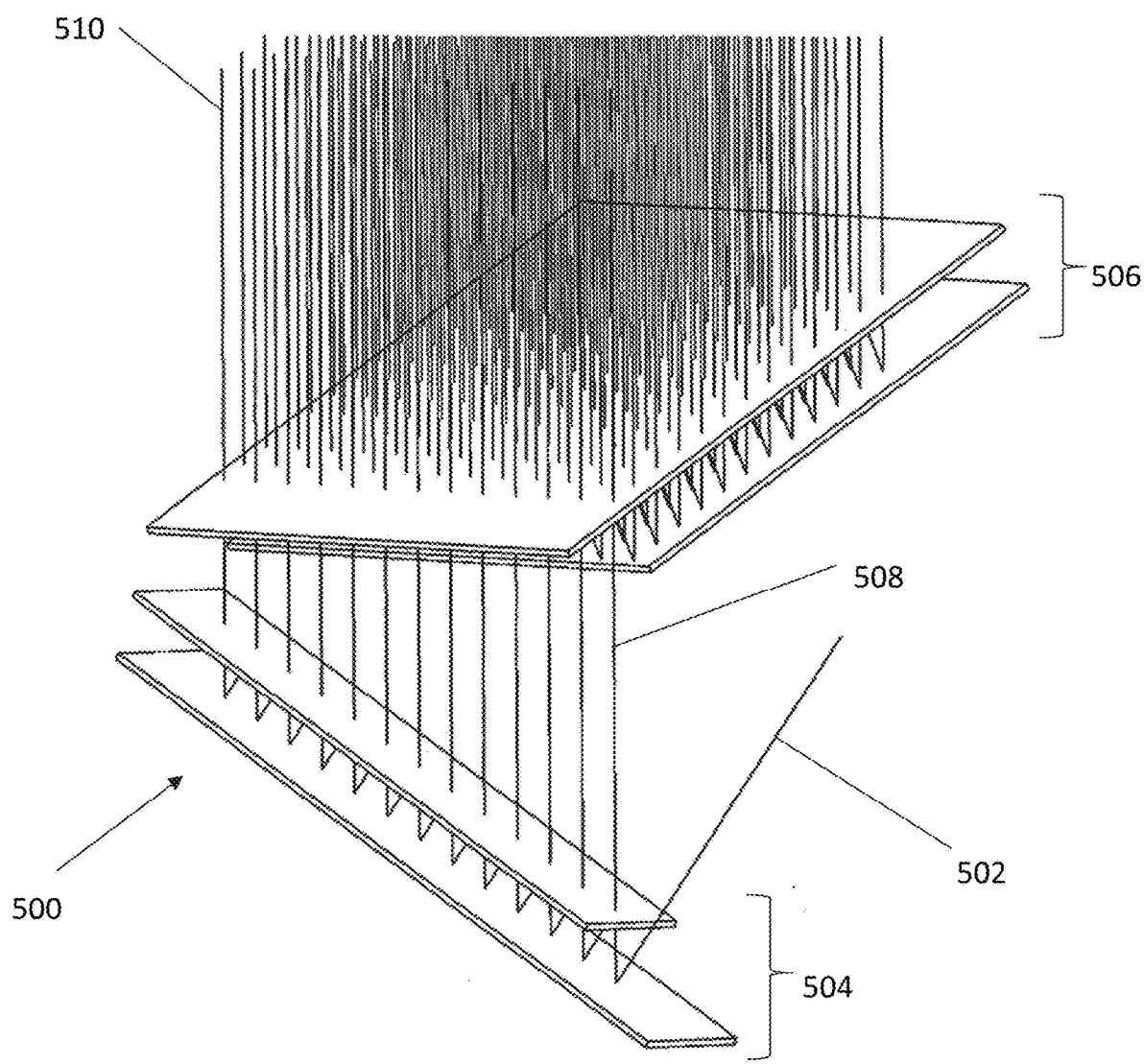
FIG. 5A shows a perspective view of a first example two-dimensional pupil expander comprising two replicators each comprising pairs of stacked surfaces.

FIG. 5A shows a perspective view of a system 500 comprising two replicators, 504, 506 arranged for expanding a light beam 502 in two dimensions.

In the system 500 of FIG. 5A, the first replicator 504 comprises a first pair of surfaces, stacked parallel to one another, and arranged to provide replication—or, pupil expansion —in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5A), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5A), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5A combine to provide a two-dimensional replicator (or, "two-dimensional pupil expander"). Thus, the replica light beams 510 may be emitted along an optical path to an expanded eye-box of a display system, such as a head-up display.

In the system of FIG. 5A, the first replicator 504 is a waveguide comprising a pair of elongate rectilinear reflective surfaces, stacked parallel to one another, and, similarly, the second replicator 504 is a waveguide comprising a pair of rectangular reflective surfaces, stacked parallel to one another. In other systems, the first replicator may be a solid elongate rectilinear waveguide and the second replicator may be a solid planar rectangular shaped waveguide, wherein each waveguide comprises an optically transparent solid material such as glass. In this case, the pair of parallel reflective surfaces are formed by a pair of opposed major sidewalls optionally comprising respective reflective and reflective-transmissive surface coatings, familiar to the skilled reader.

Figure 5B:
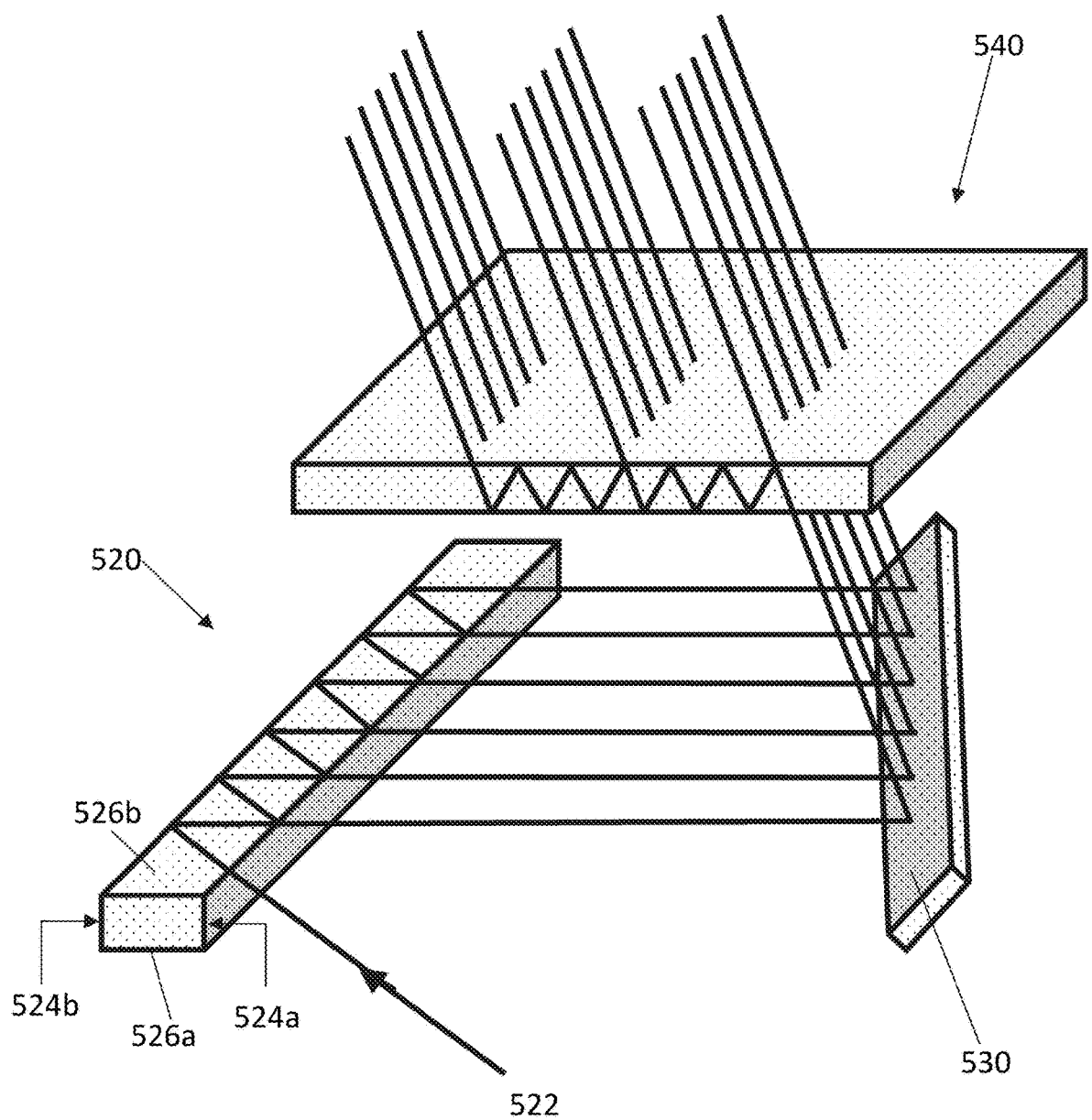
FIG. 5B shows a perspective view of a first example two-dimensional pupil expander comprising two replicators each in the form of a solid waveguide.

FIG. 5B shows a perspective view of a system 500 comprising two replicators, 520, 540 arranged for replicating a light beam 522 in two dimensions, in which the first replicator is a solid elongated waveguide 520 and the second replicator is a solid planar waveguide 540.

In the system of FIG. 5B, the first replicator/waveguide 520 is arranged so that its pair of elongate parallel reflective surfaces 524a, 524b are perpendicular to the plane of the second replicator/waveguide 540. Accordingly, the system comprises an optical coupler arranged to couple light from an output port of first replicator 520 into an input port of the second replicator 540. In the illustrated arrangement, the optical coupler is a planar/fold mirror 530 arranged to fold or turn the optical path of light to achieve the required optical coupling from the first replicator to the second replicator. As shown in FIG. 5B, the mirror 530 is arranged to receive light-comprising a one-dimensional array of replicas extending in the first dimension—from the output port/reflective-transmissive surface 524a of the first replicator/waveguide 520. The mirror 530 is tilted so as to redirect the received light onto an optical path to an input port in the (fully) reflective surface of second replicator 540 at an angle to provide waveguiding and replica formation, along its length in the second dimension. It will be appreciated that the mirror 530 is one example of an optical element that can redirect the light in the manner shown, and that one or more other elements may be used instead, to perform this task.

In the illustrated arrangement, the (partially) reflective-transmissive surface 524a of the first replicator 520 is adjacent the input port of the first replicator/waveguide 520 that receives input beam 522 at an angle to provide waveguiding and replica formation, along its length in the first dimension. Thus, the input port of first replicator/waveguide 520 is positioned at an input end thereof at the same surface as the reflective-transmissive surface 524a. The skilled reader will understand that the input port of the first replicator/waveguide 520 may be at any other suitable position.

Accordingly, the arrangement of FIG. 5B enables the first replicator 520 and the mirror 530 to be provided as part of a first relatively thin layer in a plane in the first and third dimensions (illustrated as an x-z plane). In particular, the size or "height" of a first planar layer—in which the first replicator 520 is located—in the second dimension (illustrated as the y dimension) is reduced. The mirror 530 is configured to direct the light away from a first layer/plane, in which the first replicator 520 is located (i.e. the "first planar layer"), and direct it towards a second layer/plane, located above and substantially parallel to the first layer/plane, in which the second replicator 540 is located (i.e. a "second planar layer"). Thus, the overall size or "height" of the system-comprising the first and second replicators 520, 540 and the mirror 530 located in the stacked first and second planar layers in the first and third dimensions (illustrated as an x-z plane)—in the second dimension (illustrated as the y dimension) is compact. The skilled reader will understand that many variations of the arrangement of FIG. 5B for implementing the present disclosure are possible and contemplated.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device-such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field-including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion.

The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Combiner Shape Compensation

An advantage of projecting a hologram to the eye-box is that optical compensation can be encoded in the hologram (see, for example, European patent 2936252 incorporated herein by herein). The present disclosure is compatible with holograms that compensate for the complex curvature of an optical combiner used as part of the projection system. In some embodiments, the optical combiner is the windscreen of a vehicle. Full details of this approach are provided in European patent 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channelling hologram to the viewer. The holographic projector may further comprise a control device arranged to control the delivery of angular channels to the eye-box position. British patent application 2108456.1, filed 14 Jun. 2021 and incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channeling described herein. It may be said that the control device is a light shuttering or aperturing device. The light shuttering device may comprise a 1D array of apertures or windows, wherein each aperture or window independently switchable between a light transmissive and a light non-transmissive state in order to control the delivery of hologram light channels, and their replicas, to the eye-box. Each aperture or window may comprise a plurality of liquid crystal cells or pixels.

Image Formation

Figure 6:
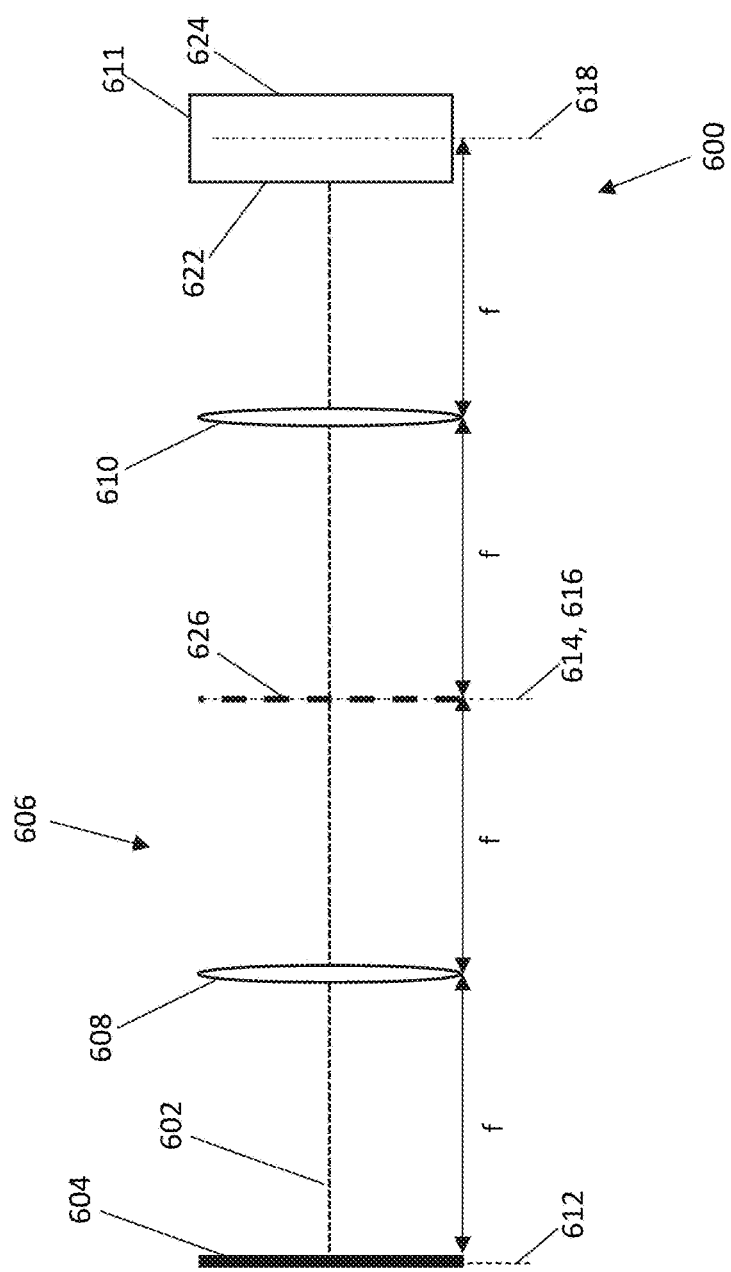
FIG. 6 is a cross-sectional schematic view of the optical components of an optical system not according to the disclosure.

FIG. 6 is a cross-sectional schematic view of the optical components of an optical system 600 not according to the disclosure. An optical axis of the optical system 600 is shown by dotted line 602 in FIG. 6. The optical system 600 comprises a display device 604 which, in this example, is a liquid crystal on silicon spatial light modulator. The display device 604 is arranged to display a hologram of a picture. Downstream of the display device 604 is an optical relay 606. The optical relay 606 comprises a first lens 608 and a second lens 610. The optical system 600 further comprises a waveguide 611 downstream of the second lens 610 of the optical relay 606. The waveguide 611 comprises a pair of opposing surfaces 622, 624 arranged to provide waveguiding of light therebetween in accordance with the previously described examples.

The first lens 608 of the optical relay 606 comprises a front focal plane 612 and a back focal plane 614. The front focal plane 612 is upstream of the first lens 608 and the back focal plane 614 is downstream of the first lens 608. The second lens 608 of the optical relay 606 comprises a front focal plane 616 and a back focal plane 618. The front focal plane 616 is upstream of the second lens 610 and the back focal plane 618 is downstream of the second lens 610. Normals of the front and back focal planes of each of the first and second lenses 608, 610 are parallel to the optical axis 602 and a distance from each of the front and back focal planes to the respective first or second lens is equal to the focal length f of the respective lens. In this example, the display device 604 is positioned substantially at the front focal plane 612 of the first lens 608. In this example, the front focal plane 616 of the second lens 610 is substantially coplanar with the back focal plane 614 of the first lens 608.

In this example, the waveguide 611 is arranged such that back focal plane 618 of the second lens 610 is between the first and second surfaces of the waveguide 622, 624. In the example shown in FIG. 6, the focal length f of the first and second lenses 608, 610 is the same. As such, the optical relay forms a 4f system (i.e. the length of the optical relay is equal to four times the focal length of either the first and second lens 608, 610). However, in other embodiments, the focal length of the first lens 608 may be different to the focal length of the second lens 610. In such cases, the optical relay may form a magnifying (or demagnifying) telescope.

The optical system 600 further comprises a coherent light source such as a laser. The coherent light source is not shown in FIG. 6. In operation of the optical system 600, the coherent light is arranged to illuminate the display device 604. Said light may thus be spatially modulated in accordance with the hologram of the picture displayed on the display device. The spatially modulated light may be received by the first lens 608 and relayed to the second lens 610. A holographic reconstruction 626 of the picture is formed at the back focal plane 612 of the first lens 608, between the first and second lenses 608, 610. The second lens 610 relays the spatially modulated light to the waveguide 611. As described in relation to earlier Figures, the waveguide 611 replicates the light received from the display device so as to form a plurality of replicas or copies of the display device 604 such that each replica comprises light spatially modulated in accordance with the hologram on the display device. In embodiments, the optical system further comprises a second waveguide (not shown in the drawings) to provide waveguiding and replication in a second direction such that a two-dimensional array of replicas is output by the second waveguide. The spatially modulated light is relayed from the output of the second waveguide to an eye-box/viewing plane (which is expanded as a result of replication achieved by the waveguides). When a viewing system (such as the eye of a user) is placed the eye-box/at the viewing plane, the viewing system receives the spatially modulated light which forms a virtual image of the picture of the hologram displayed on the display device at a virtual image distance which is encoded in the hologram.

The inventors have found that the optical system 600 is able to provide a good virtual image of the picture of the hologram when a viewing system is positioned in the viewing plane/eye-box. However, the inventors have also found that artefacts may be formed/appear at the viewing plane (i.e. the plane comprising the plurality of replicas). The artefacts may comprise dark bands resulting from the display device being illuminated with non-uniform intensity light and/or may result from the physical features of the display device (for example, scattering off features of the display device). In any case, the artefacts may be replicated by the waveguide(s) to form a repeating pattern of the artefacts at the viewing plane. This may appear, for example, as a grid of dark bands. Thus, while the virtual image of the picture/holographic reconstruction per se may be good quality, the view of the virtual image of the picture at the viewing plane may appear obstructed by the repeating pattern of artefacts. The viewing system may have to effectively "look through" the repeating pattern of artefacts to observe the virtual image.

Separation of Hologram Image and Holographic Reconstruction Image

Figure 7:
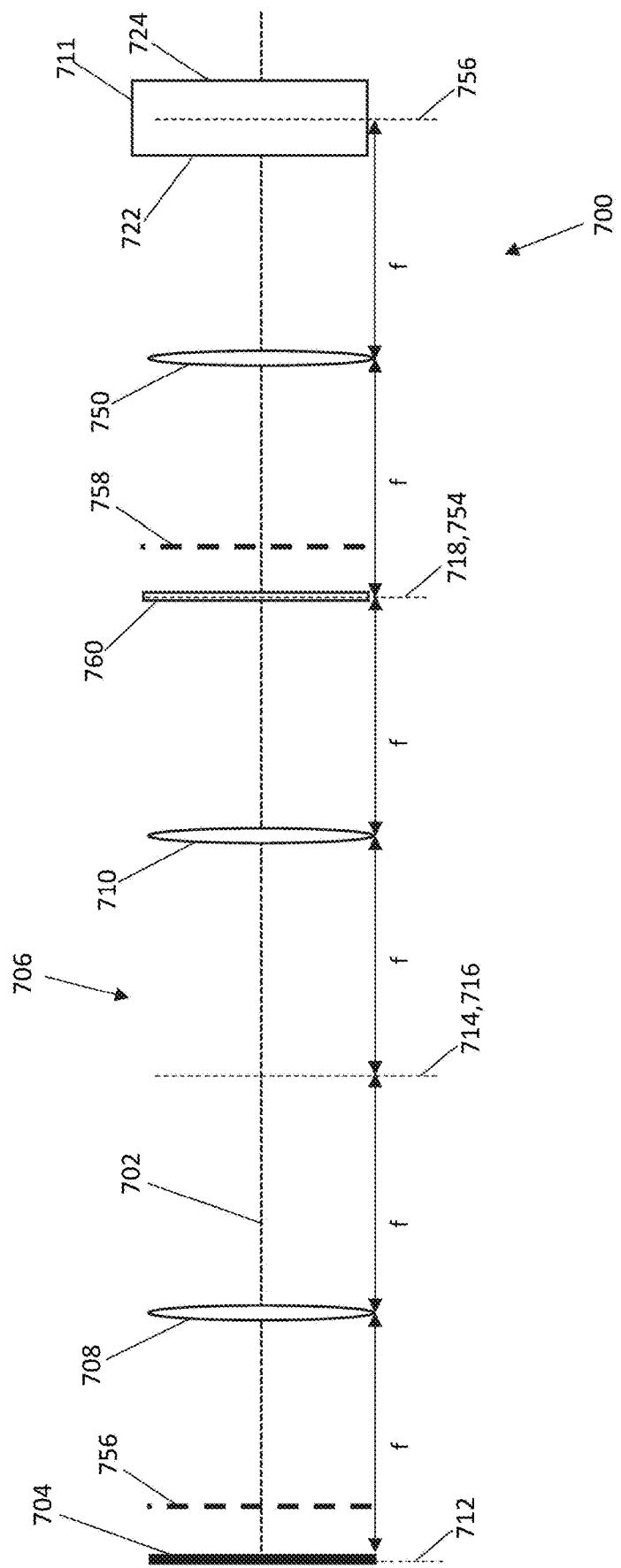
FIG. 7 is a cross-sectional schematic view of the optical components of a first optical system in accordance with the disclosure, the first optical system comprising an optical relay and being arranged to form a virtual image of a relayed hologram at infinity.

FIG. 7 is a cross-sectional schematic view of the optical components of a first optical system 700 in accordance with the disclosure which is arranged such that an image of the hologram/display device is far removed from a virtual image of a holographic reconstruction of the hologram, thus reducing or eliminating the appearance of the above-described artefacts.

The optical system 700 comprises an optical axis 702 represented by dotted line 702 in FIG. 7. The optical system 700 comprises a display device 704 which, in this example, is a liquid crystal on silicon spatial light modulator. The display device 704 is arranged to display a hologram of a picture. Downstream of the display device 704 is an optical relay 706. The optical relay 706 comprises a first lens 708 and a second lens 710.

The display device 704 and the optical relay 706 of the optical system 700 are very similar to the display device 604 and optical relay 706 of the optical system 600. For example, the first lens 708 of the optical relay 706 comprises a front focal plane 712 and a back focal plane 714. The front focal plane 712 is upstream of the first lens 708 and the back focal plane 714 is downstream of the first lens 708. The second lens 708 of the optical relay 706 comprises a front focal plane 716 and a back focal plane 718. The front focal plane 716 is upstream of the second lens 710 and the back focal plane 718 is downstream of the second lens 710. Normals of the front and back focal planes of each of the first and second lenses 708, 710 are parallel to the optical axis 702 and a distance from each of the front and back focal planes to the respective first or second lens is equal to the focal length f of the respective lens. In this example, the display device 704 is positioned substantially at the front focal plane 712 of the first lens 708. In this example, the front focal plane 716 of the second lens 710 is substantially coplanar with the back focal plane 714 of the first lens 708. In the example shown in FIG. 7, the focal length f of the first and second lenses 708, 710 is the same. As such, the optical relay forms a 4f system (i.e. the length of the optical relay is equal to four times the focal length f of either the first and second lens 708, 710). However, in other embodiments, the focal length of the first lens 708 may be different to the focal length of the second lens 710. In such cases, the optical relay may be form a magnifying (or demagnifying) telescope.

Unlike the optical system 600, the optical system 700 further comprises an optical component 750 between the second lens 710 and a waveguide 711. The optical component 750 in this example is a (third) lens. In this example, the third lens 750 is a Fourier lens. A front focal plane 754 of the third lens 750 is upstream of the third lens 750 and is substantially co-planar with the back focal plane 718 of the second lens 710. A back focal plane 756 of the third lens 750 positioned between first and second surfaces 722,724 of the waveguide 711.

In this example, the focal length f of the third lens 750 is the same as the focal length f of the first and second lenses 708, 710. As such, the optical relay 706 and the third lens 750 collectively define a 6f system (in which the separation between the front focal plane 712 of the first lens 708 and the back focal plane 756 of the third lens 750 is equal to six times the focal length of the first/second or third lens 708, 710, 752). However, in other examples, the focal length of the third lens 750 may be different to the focal length of the first lens 708 and/or second lens 710.

So, an important difference between the optical system 600 and the optical system 700 according to the disclosure is that the optical system 700 according to the disclosure comprises an additional lens 750 between the display device 704 and the waveguide 711.

Another important difference between the optical system 600 and the optical system 700 is that, in the optical system 700, the hologram displayed on the display device 704 is arranged such that a holographic reconstruction 756 of the picture of the hologram is formed downstream of the display device when the display device 704 is illuminated with coherent light from a coherent light source such as a laser. This is holographic reconstruction 756 which is formed without the use of a physical lens between the display device 704 and the holographic reconstruction 756. Instead, the hologram is calculated to form the holographic reconstruction 756 at this location. In particular, the hologram is calculated/arranged such that the holographic reconstruction 756 is formed such that a distance between the holographic reconstruction 756 and the first lens 708 is less than the focal length f of the first lens 708 while the distance between the display device 704 and the first lens 708 is equal to the focal length f of the first lens 708.

The optical relay 706 is arranged to relay the hologram on the display device to form a relayed hologram 760 downstream of the second lens 710 and to form a relayed holographic reconstruction 758 downstream of relayed hologram 760. The relayed hologram 760 corresponds to the display device (comprising the displayed hologram of the picture). The relayed holographic reconstruction 758 corresponds to the holographic reconstruction 756.

In this example, the relayed holographic reconstruction 758 is formed such that a distance between the relayed holographic reconstruction 758 and the third lens 750 is less than the focal length of the third lens 750 while the distance between the relayed hologram 760 and the third lens 750 is equal to the focal length of the third lens 750. By positioning the relayed hologram 760 and the relayed holographic reconstruction 758 with respect to the third lens 750 in this way, the third lens 750 can form images of the relayed hologram and relayed holographic reconstruction that are far removed from one another. This is explained in more detailed in relation to FIG. 8.

Figure 8:
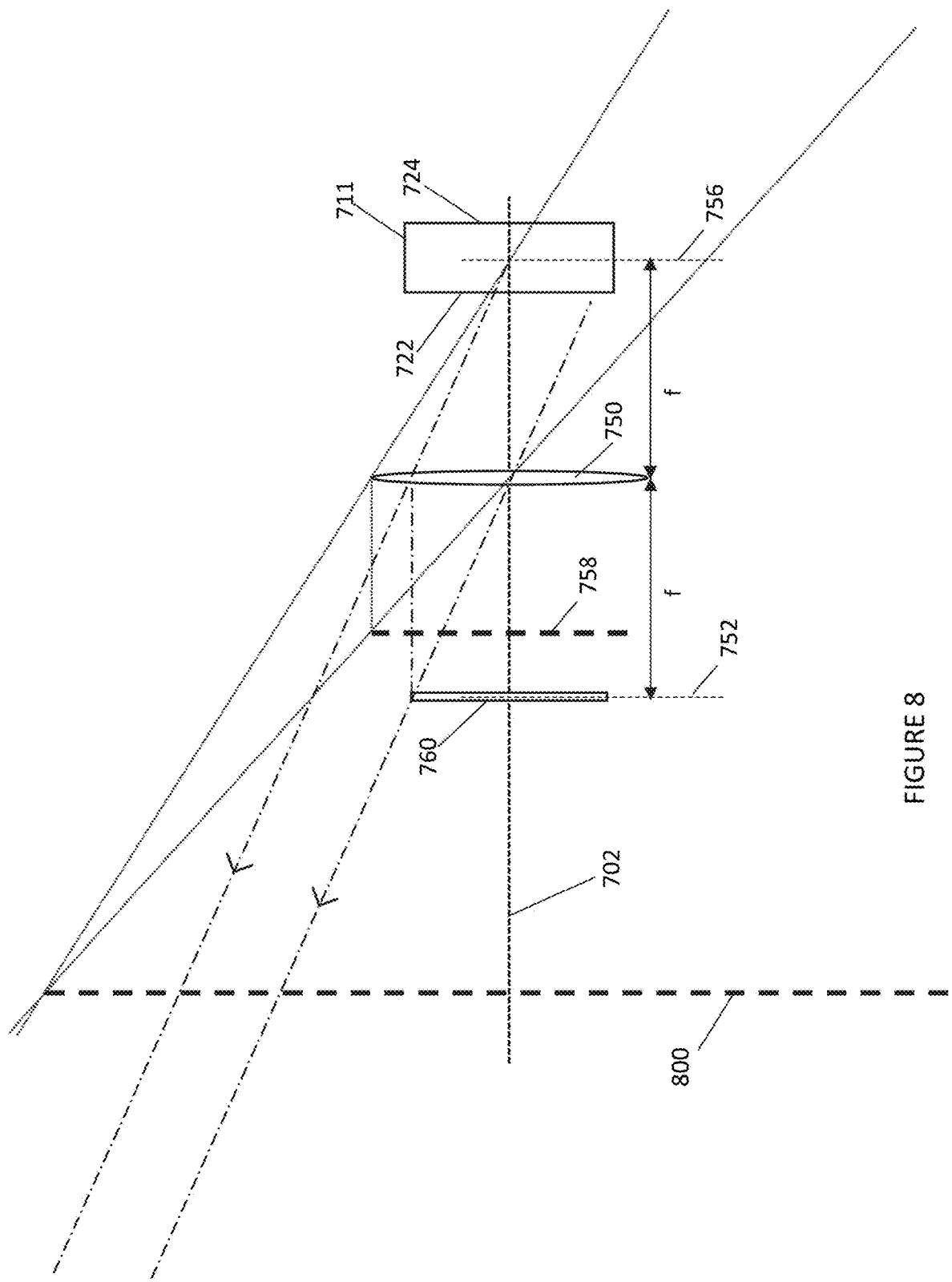
FIG. 8 shows a cross-sectional schematic ray diagram showing features of the first optical system of FIG. 7.

FIG. 8 shows a cross-sectional schematic view of the third lens 750 and the waveguide 711 of FIG. 7 (as well as the relayed hologram 760 and relayed holographic reconstruction 758). These components are shown separately from the other optical components of the optical system 700 (such as the display device 704 and the optical relay 706). FIG. 8 is a schematic ray diagrams showing rays from the relayed hologram 760 and the relayed holographic reconstruction 758.

As the skilled person will understand, a (convex) lens (such as the third lens 750) will form a virtual image of an object at infinity when the object to be imaged is positioned at the focal length of the lens. As above, the relayed hologram 760 is formed (by the optical relay 706) at the focal length f of the third lens 750 (in particular, at the front focal plane 752 of the third lens 750). Thus, the third lens 750 is arranged to form a virtual image of the relayed hologram 760 at infinity. The virtual image at infinity is upstream of the display device 704/third lens 750. The formation of this virtual image is represented by the rays coming from the relayed hologram 760 to the third lens 750 and then extending parallel. Said rays are shown by the broken lines comprising dots and dashes in an alternating configuration in FIG. 8.

The skilled person will also understand that a (convex) lens (such as the third lens 750) will form a virtual image of an object at a finite image distance upstream of said lens when the object to be imaged is positioned such that a distance between the object and the lens is less than the focal length of the lens. As above, the relayed holographic reconstruction 758 is formed (by the optical relay 706) such that the distance between the relayed holographic reconstruction 758 and the third lens 750 is less than the focal length of the third lens 750. In other words, the relayed holographic reconstruction 758 is positioned between the front focal plane 752 of the third lens 750 and the third lens 750 itself. By forming the relayed holographic reconstruction 758 here, the third lens 750 is arranged to form a virtual image 800 of the relayed holographic reconstruction 758 upstream of the third lens 750 and at a finite image distance. The formation of this virtual image 800 is represented by the rays coming from the relayed holographic reconstruction 758 to the third lens 750 and then converging upstream of the third lens 750. Said rays are shown by broken lines comprising dots only in FIG. 8.

Both the virtual image of the relayed hologram 760 and the virtual image 800 of the relayed holographic reconstruction 758 are upstream of the third lens 750. However, the virtual image distance of the virtual image of the relayed hologram 760 is at infinity whereas the virtual image distance of the virtual image 800 of the relayed holographic reconstruction 758 is finite. Thus, the two virtual images are far removed from one another (in fact, the separation between the two virtual images is effectively infinite). The artefacts (described above) may be features in the virtual image of the relayed hologram 760. The appearance of the artefacts may not be present/apparent in the virtual image 800 of the relayed holographic reconstruction 758. The inventors have found that, by separating the two virtual images as described, the prominence of the artefacts in a viewing system's field of view may be substantially reduced or even eliminated. Without wishing to be bound by theory, it is believed that this is because the virtual image of the relayed hologram 760 (comprising the artefacts) is far removed from the virtual image of the relayed holographic reconstruction 758 and, in this case, projected right out to infinity, beyond the virtual image of the relayed holographic reconstruction 758. Thus, the viewing system is not required to "look through" the virtual image of the relayed hologram 760 to view the virtual image of the relayed holographic reconstruction 758.

Figure 9:
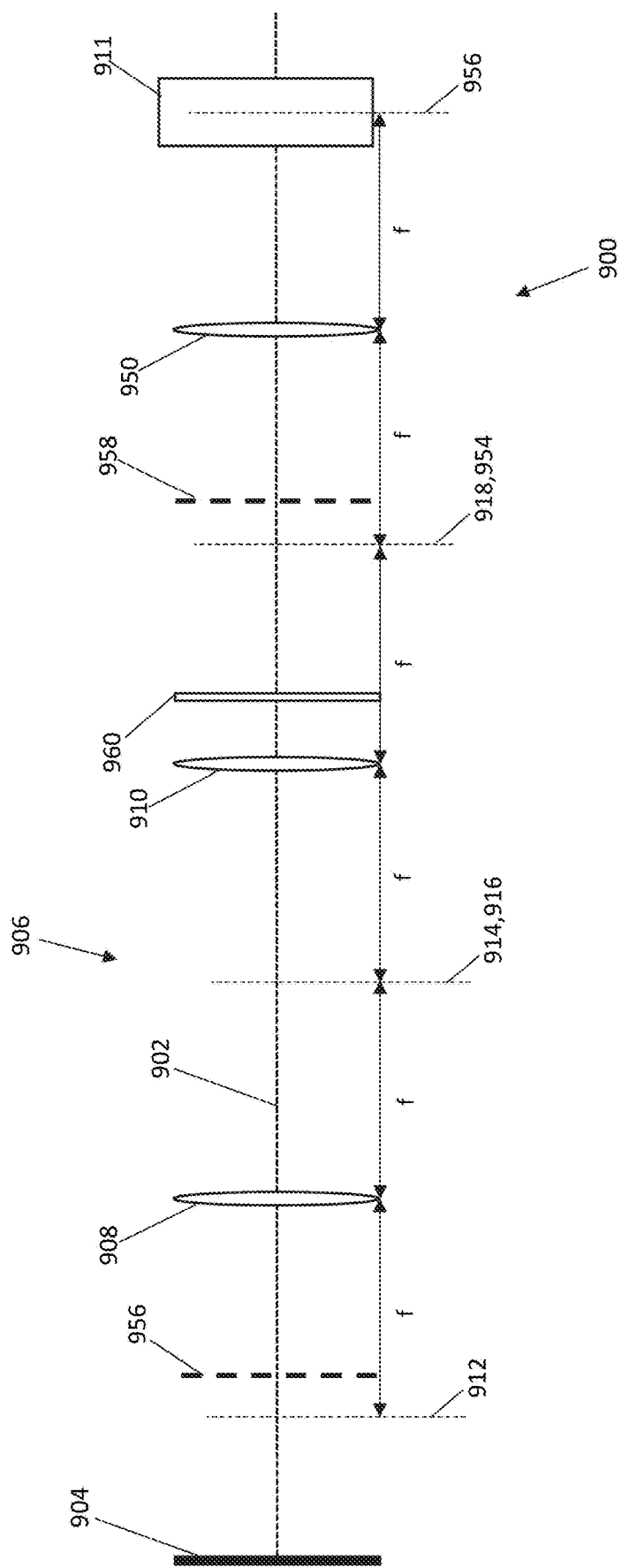
FIG. 9 is a cross-sectional schematic view of the optical components of a second optical system in accordance with the disclosure, the second optical system comprising an optical relay and being arranged to form a real image of a relayed hologram.

FIG. 9 is a cross-sectional schematic view of the optical components of a second optical system 900 in accordance with the disclosure which is arranged such that an image of the hologram/display device is far removed from the virtual image of the holographic reconstruction, thus reducing or eliminating the appearance of the above-described artefacts. The second optical system 900 is similar to the first optical system 700 in that the second optical system 900 is arranged such that a relayed hologram and relayed holographic reconstruction are formed at positions with respect to a third lens so that images of the two are far removed from one another. However, in the second optical system 900, the image of the relayed hologram is a real image formed downstream of the waveguide (for example, behind a viewing system) rather than at infinity and upstream of the third lens. This is described in more detail below.

The optical system 900 comprises an optical axis represented by dotted line 902 in FIG. 9. The optical system 900 comprises a display device 904 which, in this example, is a liquid crystal on silicon spatial light modulator. The display device 904 is arranged to display a hologram of a picture. Downstream of the display device 904 is an optical relay 906. The optical relay 906 comprises a first lens 908 and a second lens 910. The optical system 900 further comprises a third lens 950.

The display device 904, the optical relay 906 and the third lens 950 of the optical system 900 are very similar to the display device 704, optical relay 706 and third lens of the first optical system 700. For example, the first lens 908 of the optical relay 906 comprises a front focal plane 912 and a back focal plane 914. The front focal plane 912 is upstream of the first lens 908 and the back focal plane 914 is downstream of the first lens 908. The second lens 910 of the optical relay 906 comprises a front focal plane 916 and a back focal plane 918. The front focal plane 916 is upstream of the second lens 910 and the back focal plane 918 is downstream of the second lens 910. Normals of the front and back focal planes of each of the first and second lenses 908, 910 are parallel to the optical axis 902 and a distance from each of the front and back focal planes to the respective first or second lens is equal to the focal length f of the respective lens. In this example, the front focal plane 916 of the second lens 910 is substantially coplanar with the back focal plane 914 of the first lens 908. In the example shown in FIG. 9, the focal length f of the first and second lenses 908, 910 is the same. As such, the optical relay forms a 4f system (i.e. the length of the optical relay is equal to four times the focal length f of either the first and second lens 908, 910). However, in other embodiments, the focal length of the first lens 908 may be different to the focal length of the second lens 910. In such cases, the optical relay may form a magnifying (or demagnifying) telescope. As in the first optical system 700, the third lens 950 is a Fourier lens. A front focal plane 954 of the third lens 950 is upstream of the third lens and is substantially co-planar with the back focal plane 918 of the second lens 910. A back focal plane 956 of the third lens 950 positioned between first and second surfaces of the waveguide 911. In this example, the focal length f of the third lens 950 is the same as the focal length of the first and second lenses 908, 910. As such, the optical relay 906 and the third lens 950 collectively define a 6f system (in which the separation between the front focal plane 912 of the first lens 908 and the back focal plane 956 of the third lens 950 is equal to six times the focal length of the first/second or third lens 908, 910, 952). However, in other examples, the focal length of the third lens 950 may be different to the focal length of the first lens 908 and/or second lens 910.

The key difference between the first optical system 700 and the second optical system 900 is that, in the second optical system 900, the display device 904 is not positioned substantially at the front focal plane 912 of the first lens 908 (as is the case in the first optical system 700). Instead, the distance between the display device 904 and the first lens 908 is greater than the focal length f of the first lens 908. However, like in the first optical system 700, in the second optical system 900, the hologram displayed on the display device 904 is arranged such that a holographic reconstruction 956 of a picture of the hologram is formed downstream of the display device such that a distance between the holographic reconstruction 956 and the first lens 908 is less than the focal length f of the first lens 908. As such, a distance between the display device 904 and the holographic reconstruction 956 in the second optical system 900 is greater than a distance between the display device 704 and the holographic reconstruction 756 in the second optical system 700.

The optical relay 906 is arranged to relay the hologram on the display device to form a relayed hologram 960 downstream of the second lens 910 and to form a relayed holographic reconstruction 958 downstream of relayed hologram 960. The relayed hologram 960 corresponds to the display device (comprising the displayed hologram of the picture). The relayed holographic reconstruction 958 corresponds to the holographic reconstruction 956.

In this example, the relayed holographic reconstruction 958 is formed such that a distance between the relayed holographic reconstruction 958 and the third lens 950 is less than the focal length of the third lens 950 while the distance between the relayed hologram 960 and the third lens 950 is greater than the focal length of the third lens 950. By positioning the relayed hologram 960 and the relayed holographic reconstruction 986 with respect to the third lens 950 in this way, the third lens 950 can form images of the relayed hologram and relayed holographic reconstruction that are far removed from one another. This is explained in more detailed in relation to FIG. 10.

Figure 10:
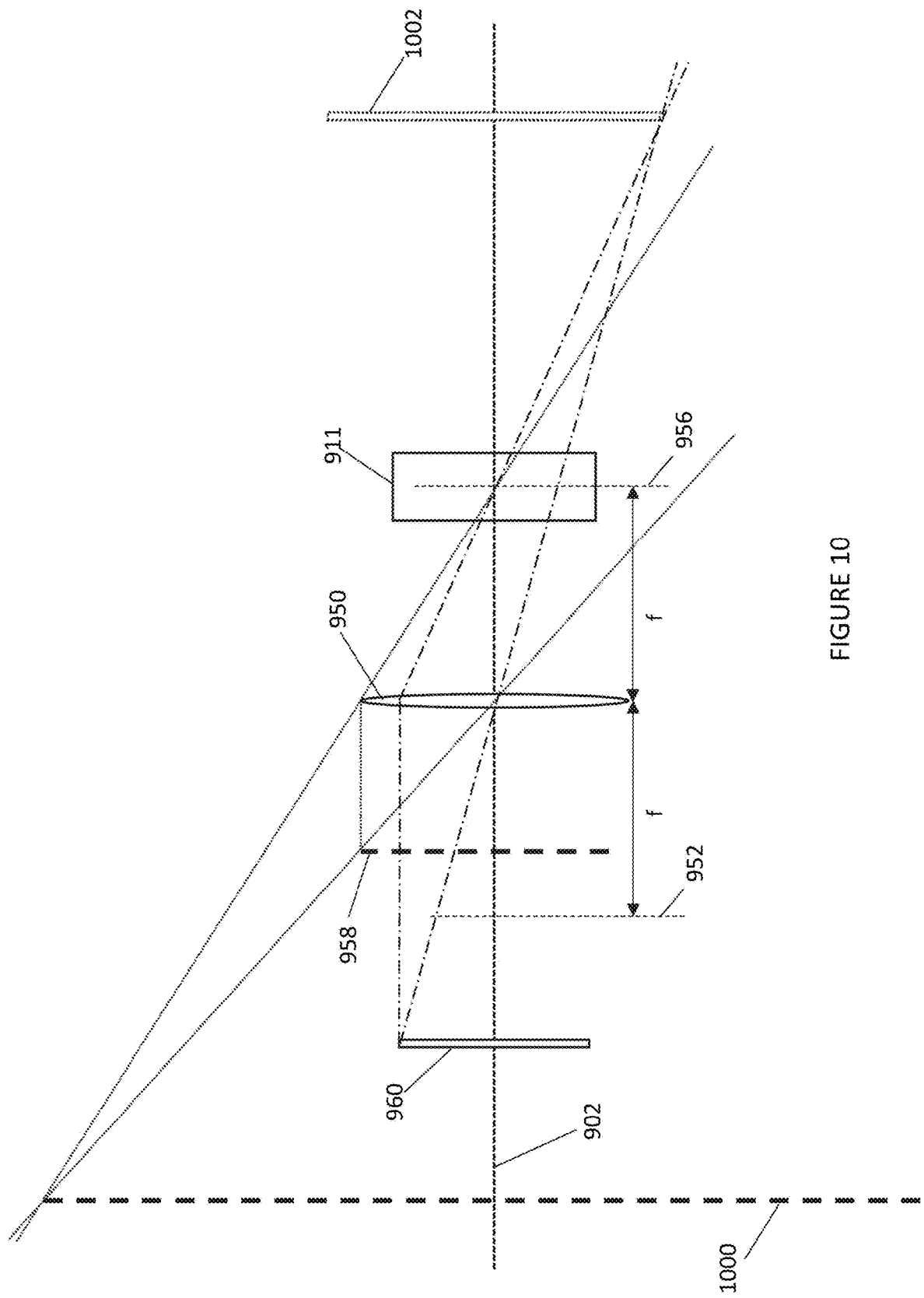
FIG. 10 shows a cross-sectional schematic ray diagram showing features of the first optical system of FIG. 9.

FIG. 10 shows a cross-sectional schematic view of the third lens 950 and the waveguide 911 of FIG. 9 (as well as the relayed hologram 960 and relayed holographic reconstruction 958). These components are shown separately from the other optical components of the optical system 900 (such as the display device 904 and the optical relay 906). FIG. 10 is a schematic ray diagrams showing rays from the relayed hologram 960 and the relayed holographic reconstruction 958.

As the skilled person will understand, a (convex) lens (such as the third lens 958) will form a real image of an object when the object to be imaged is positioned beyond the focal length of the lens. Said real image will be formed at a finite image distance downstream of said lens. As above, the relayed hologram 960 is formed (by the optical relay 906) beyond the focal length f of the third lens 950. In particular, the distance between the relayed hologram 960 and the third lens 950 is greater than the focal length f of the third lens. Thus, the third lens 950 is arranged to form a real image 1002 of the relayed hologram 960 downstream of the third lens 950. The formation of this real image 1002 is represented by the rays coming from the relayed hologram 960 to the third lens 950 and then converging at a point which is downstream of the third lens 950 (and waveguide 911). Said rays are shown by the broken lines comprising dots and dashes in an alternating configuration in FIG. 10.

In both the first and second optical systems 700,900, the relayed holographic reconstruction is formed (by the optical relay) such that the distance between the relayed holographic reconstruction and the third lens is less than the focal plane of the third lens. Thus, like in the first optical system 700, in the second optical system 900, the third lens 950 is arranged to form a virtual image 1000 of the relayed holographic reconstruction 958 upstream of the third lens 950 and at a finite image distance. The formation of this virtual image 100 is represented by the rays coming from the relayed holographic reconstruction 958 to the third lens 950 and then converging at a point which is upstream of the third lens 950. Said rays are shown by the broken lines comprising dots only in FIG. 10.

So, the third lens 950 (and optical system 900 more generally) is arranged to form a virtual image of the relayed holographic reconstruction 958 upstream of the third lens and a real image of the relayed hologram 960 downstream of the waveguide 911. In this way, the two images (virtual and real) are far removed from one another.

In examples, the real image of the relayed hologram 960 is downstream of a viewing window/eyebox (which is not shown in the Figures but which would be located between the waveguide 911 and the real image of the relayed hologram 960). Thus, because, as above, it is believed that the artefacts are visible/apparent in the image of relayed hologram 960 and not the relayed holographic reconstruction 958, the prominence of the artefacts in a viewing system's field of view may be substantially reduced or even eliminated. In particular, the image of the relayed holographic reconstruction 958 is in front of the viewing system and the relayed hologram 960 is behind the viewing system such that the viewing system is not required to "look through" an image of the relayed hologram (comprising the artefacts) when viewing the virtual image of the holographic reconstruction 958.

The first and second optical systems 700,900 (according to the disclosure) described above each comprise an optical relay 702,902. The optical relay in each example forms a relayed hologram 760,960 and a relayed holographic reconstruction 758,958 of a picture of the hologram. The third lens 750,950 in each examples then forms images of the relayed hologram and relayed holographic reconstruction. Some examples according to the disclosure do not comprise the optical relay. These examples comprise a (single) lens which forms images of the hologram/display device per se and the holographic reconstruction per se, rather than relayed versions of the hologram and holographic reconstruction. However, the principal is substantially the same as previously described in that the hologram/display device and holographic reconstruction are positioned with respect to the (single) lens so that the image of the hologram/display device is far removed from the image of the holographic reconstruction such that the appearance/impact of the above-described artefacts is reduced/eliminated. Such examples (absent of an optical relay) are described herein in relation to FIGS. 11 and 12.

Figure 11:
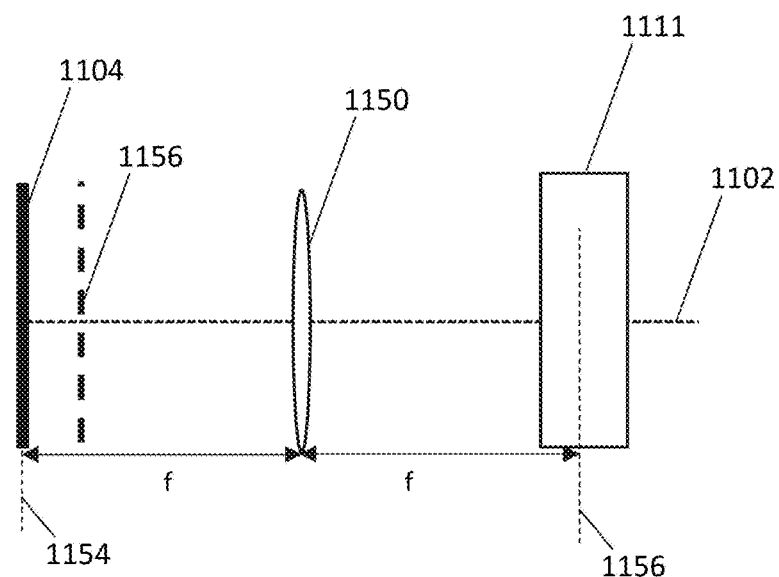
FIG. 11 shows a cross-sectional schematic view of the optical components of a third optical system in accordance with the disclosure, the third optical system not comprising an optical relay and being arranged to form a virtual image of a hologram at infinity.

FIG. 11 shows a cross-sectional schematic view of a third example of a optical system 1100. The optical system 1100 does not comprise an optical relay.

The optical system 1100 comprises an optical axis represented by dotted line 1102 in FIG. 11. The optical system 1100 comprises a display device 1104 which, in this example, is a liquid crystal on silicon spatial light modulator. The display device 1104 is arranged to display a hologram of a picture. The optical system 1100 further comprises a (single) lens 1150 downstream of the display device 1104 which, in this example, is a converging Fourier lens. A front focal plane 1154 of the third lens 1150 is upstream of the lens. A back focal plane 1156 of the lens 1150 is positioned between first and second surfaces of the waveguide 1111. The display device 1104 is positioned substantially at the front focal plane 1152 of the lens 1150 such that the distance between the display device 1104 and the lens 1150 is equal to the focal length f of the third lens 1150. The hologram displayed on the display device 1104 is arranged such that a holographic reconstruction 1156 of a picture of the hologram is formed downstream of the display device such that a distance between the holographic reconstruction 1156 and the lens 1150 is less than the focal length f of the lens 950. By positioning the hologram 1160 and the relayed holographic reconstruction 1186 with respect to the lens 1150 in this way, the lens 1150 can form images of the hologram and holographic reconstruction that are far removed from one another. In particular, the lens 1158 will form a virtual image of the hologram 1160 upstream of the display device 1104 at infinity and will form a virtual image of the holographic reconstruction 1158 upstream of the display device 1104 at a finite image distance. Thus, the two virtual images are far removed from one another (in fact, the separation between the two virtual images is effectively infinite).

Figure 12:
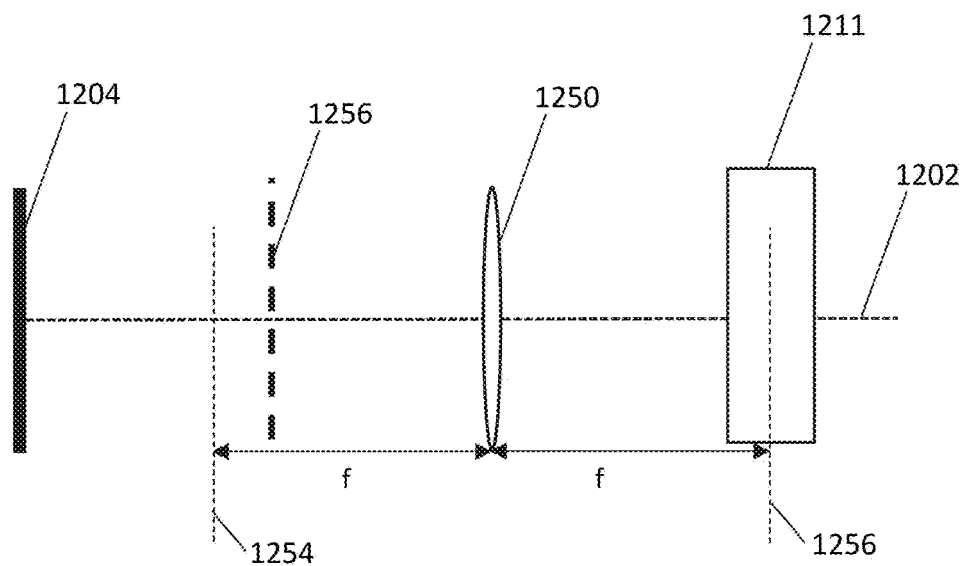
FIG. 12 shows a cross-sectional schematic view of the optical components of a fourth optical system in accordance with the disclosure, the fourth optical system not comprising an optical relay and being arranged to a form real image of a hologram.

FIG. 12 shows a cross-sectional schematic view of a fourth example of a optical system 1200. Again, the optical system 1200 does not comprise an optical relay.

The optical system 1200 comprises an optical axis represented by dotted line 1202 in FIG. 12. The optical system 1200 comprises a display device 1204 which, in this example, is a liquid crystal on silicon spatial light modulator. The display device 1204 is arranged to display a hologram of a picture. The optical system 1200 further comprises a (single) lens 1250 downstream of the display device 1204 which, in this example, is a converging Fourier lens. A front focal plane 1254 of the lens 1250 is upstream of the lens. A back focal plane 1256 of the lens 1250 is positioned between first and second surfaces of the waveguide 1211. The display device 1204 is positioned beyond the front focal plane 1254 of the lens 1250 such that the distance between the display device 1204 and the lens 1250 is greater than the focal length f of the lens 1250. The hologram displayed on the display device 1204 is arranged such that a holographic reconstruction 1256 of a picture of the hologram is formed downstream of the display device such that a distance between the holographic reconstruction 1256 and the lens 1250 is less than the focal length f of the lens 1250. By positioning the hologram 1260 and the relayed holographic reconstruction 1256 with respect to the lens 1250 in this way, the lens 1250 can form images of the hologram and holographic reconstruction that are far removed from one another. In particular, the lens 1250 will form a real image of the hologram 1160 downstream of the waveguide 1211 and will form a virtual image of the holographic reconstruction 1258 upstream of the display device 1204 at a finite image distance. Thus, the two virtual images are far removed from one another (in fact, the separation between the two virtual images is effectively infinite).

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. An optical system comprising a viewing window, wherein the optical system further comprises:
    a display device arranged to spatially modulate light in accordance with a hologram displayed thereon to form a holographic wavefront, wherein the holographic wavefront forms a holographic reconstruction of an image, and wherein the holographic reconstruction of the image is formed downstream of the display device;
    a waveguide arranged to receive the holographic wavefront and waveguide the holographic wavefront between a pair of reflective surfaces thereof, wherein one surface of the pair of reflective surfaces is partially transmissive such that a plurality of replicas of the holographic wavefront are emitted therefrom;

an optical component between the holographic reconstruction and the waveguide, wherein the optical component is arranged to (a) form a virtual image of the holographic reconstruction upstream of the display device and (b) form an image of the displayed hologram at one of infinity or downstream of the waveguide;

an optical relay between the display device and the waveguide, wherein the optical relay comprises two lenses arranged in cooperation to form a relayed hologram and a relayed holographic reconstruction, wherein the relayed hologram is an image of the hologram displayed on the display device, and wherein the relayed holographic reconstruction is an image of the holographic reconstruction formed by the hologram displayed on the display device; and wherein the optical component is between the relayed holographic reconstruction and the waveguide, and wherein (a) a distance between the relayed holographic reconstruction and the optical component is less than a focal length of the optical component such that the virtual image of the holographic reconstruction formed by the optical component is a virtual image of the relayed holographic reconstruction, and (b) a distance between the relayed hologram and the optical component is equal to a focal length of the optical component such that the image of the hologram formed by the optical component is a virtual image formed at infinity.

2. The optical system of claim 1, wherein the optical component is arranged such that the wavefront coupled into the waveguide comprises a transform of a holographic wavefront encoding a picture.

3. The optical system of claim 1, wherein the optical component is arranged such that the wavefront coupled into the waveguide comprises a Fourier transform of the holographic wavefront.

4. The optical system of claim 1, wherein a distance between the virtual image of the holographic reconstruction and the image of the displayed hologram formed by the optical component is one of (i) greater than 1 meter, (ii) greater than 2 meters, or (iii) greater than 5 meters.

5. The optical system of claim 1, wherein the optical component is arranged such that a distance from the optical component to the virtual image of the holographic reconstruction is in a range of between about 0.5 to 10 meters.

6. The optical system of claim 1, wherein a focal length of the optical component is one of (i) less than 150 mm, (ii) less than 120 mm, or (iii) less than 100 mm.

7. The optical system of claim 1, wherein the holographic wavefront received by the waveguide comprises non-collimated light.

8. The optical system of claim 7, wherein the non-collimated light comprises diverging light.

9. The optical system of claim 1, wherein the hologram comprises a plurality of superimposed diffractive patterns each representative of a lens that forms an image point of the image, and wherein each diffractive pattern is representative of a lens.

10. The optical system of claim 9, wherein each diffractive pattern brings light to a focal point.

11. A method of holographic image formation, the method comprising:

spatially modulating light in accordance with a hologram displayed on a display device to form a holographic wavefront;

forming a holographic reconstruction of an image, wherein the holographic reconstruction is formed downstream of the display device;

forming a virtual image of the holographic reconstruction upstream of the display device using an optical component;

forming a relayed hologram and a relayed holographic reconstruction with an optical relay between the display device and waveguide, wherein the optical relay comprises two lens arranged in cooperation, wherein the relayed hologram is an image of the hologram displayed on the display device, and wherein the relayed holographic reconstruction is an image of the holographic reconstruction formed by the hologram displayed on the display device;

wherein the optical component is between the relayed holographic reconstruction and the waveguide, and wherein (a) a distance between the relayed holographic reconstruction and the optical component is less than a focal length of the optical component such that the virtual image of the holographic reconstruction formed by the optical component is a virtual image of the relayed holographic reconstruction and (b) a distance between the relayed hologram and the optical component is equal to a focal length of the optical component such that the image of the hologram formed by the optical component is a virtual image formed at infinity;

forming an image of the displayed hologram at infinity or downstream of a waveguide using the optical component; and receiving the holographic wavefront at a waveguide and waveguiding the holographic wavefront between a pair of reflective surfaces thereof, wherein one surface of the pair of reflective surfaces is partially transmissive such that a plurality of replicas of the holographic wavefront are emitted therefrom;

wherein the optical component is between the holographic reconstruction and the waveguide.

12. Tangible, non-transitory computer-readable media comprising program instructions stored therein, wherein the program instructions, when executed by one or more processors, cause an optical system to perform a method of holographic image formation comprising:

spatially modulating light in accordance with a hologram displayed on a display device to form a holographic wavefront;

forming a holographic reconstruction of an image, wherein the holographic reconstruction is formed downstream of the display device;

forming a virtual image of the holographic reconstruction upstream of the display device using an optical component;

forming a relayed hologram and a relayed holographic reconstruction with an optical relay between the display device and waveguide, wherein the optical relay comprises two lens arranged in cooperation, wherein the relayed hologram is an image of the hologram displayed on the display device, and wherein the relayed holographic reconstruction is an image of the holographic reconstruction formed by the hologram displayed on the display device;

wherein the optical component is between the relayed holographic reconstruction and the waveguide, and wherein (a) a distance between the relayed holographic reconstruction and the optical component is less than a focal length of the optical component such that the virtual image of the holographic reconstruction formed by the optical component is a virtual image of the relayed holographic reconstruction and (b) a distance between the relayed hologram and the optical component is equal to a focal length of the optical component such that the image of the hologram formed by the optical component is a virtual image formed at infinity;

forming an image of the displayed hologram downstream of a waveguide using the optical component; and receiving the holographic wavefront at a waveguide and waveguiding the holographic wavefront between a pair of reflective surfaces thereof, wherein one surface of the pair of reflective surfaces is partially transmissive such that a plurality of replicas of the holographic wavefront are emitted therefrom;

wherein the optical component is between the holographic reconstruction and the waveguide.

* * * * *